United States Patent
Swann et al.

(10) Patent No.: US 9,247,548 B2
(45) Date of Patent: Jan. 26, 2016

(54) DATA SERVICE LEVEL UPLINK DATA FLOW CONTROL

(71) Applicant: BlackBerry Limited, Waterloo (CA)

(72) Inventors: Craig Ian Haight Swann, Waterloo (CA); Joseph Tu-Long Deu-Ngoc, Maryhill (CA)

(73) Assignee: BlackBerry Limited, Waterloo (CA)

( * ) Notice: Subject to any disclaimer, the term of this patent is extended or adjusted under 35 U.S.C. 154(b) by 196 days.

(21) Appl. No.: 13/625,234

(22) Filed: Sep. 24, 2012

(65) Prior Publication Data

US 2014/0086050 A1    Mar. 27, 2014

(51) Int. Cl.
| | |
|---|---|
| G01R 31/08 | (2006.01) |
| H04W 72/08 | (2009.01) |
| H04W 52/02 | (2009.01) |
| H04L 12/825 | (2013.01) |
| H04W 28/02 | (2009.01) |
| H04L 12/851 | (2013.01) |

(52) U.S. Cl.
CPC ............. *H04W 72/08* (2013.01); *H04L 47/25* (2013.01); *H04W 52/0254* (2013.01); *H04L 47/24* (2013.01); *H04W 28/0231* (2013.01)

(58) Field of Classification Search
CPC ............ H04W 72/08; H04W 52/0254; H04W 28/0231; H04L 47/25; H04L 47/24
See application file for complete search history.

(56) References Cited

U.S. PATENT DOCUMENTS

| | | | |
|---|---|---|---|
| 6,731,907 B1 | 5/2004 | Seon | |
| 7,734,262 B2 | 6/2010 | Akbar Attar | |
| 7,817,999 B2* | 10/2010 | Tang et al. | 455/432.1 |
| 8,208,394 B2* | 6/2012 | Ho et al. | 370/252 |
| 8,406,748 B2* | 3/2013 | Raleigh et al. | 455/414.1 |
| 8,649,343 B2* | 2/2014 | Ahn et al. | 370/329 |
| 8,688,661 B2* | 4/2014 | Greiner et al. | 707/703 |
| 2002/0080719 A1 | 6/2002 | Parkvall | |
| 2003/0117956 A1* | 6/2003 | Lee | 370/232 |
| 2003/0210649 A1 | 11/2003 | Bondi | |
| 2004/0037255 A1* | 2/2004 | Joong et al. | 370/338 |
| 2005/0207340 A1 | 9/2005 | O'Neill | |
| 2006/0146744 A1 | 7/2006 | Vasudevan | |

(Continued)

FOREIGN PATENT DOCUMENTS

| | | |
|---|---|---|
| EP | 1489876 A1 | 12/2004 |
| EP | 1655901 A1 | 5/2006 |

(Continued)

OTHER PUBLICATIONS

Transmission Timing—a Control Approach to Distributed Uplink Scheduling in WCDMA David Tornqvist, Erik Geijer Lundin, Fredrik Gunnarsson, Fredrik Gustafsson Proceedings of the American Control Conference vol. 2, pp. 1667-1672, Jun. 30, 2004.

(Continued)

*Primary Examiner* — Robert Wilson
(74) *Attorney, Agent, or Firm* — Moffat & Co.

(57) ABSTRACT

A method and a mobile device for limiting uplink transmission for user data at the data service level are provided. At least one least one characteristic related to uplink transmission is monitored and uplink transmission for user data is limited at the data service level based at least in part on the at least one characteristic. Battery power can potentially be saved by limiting uplink transmission for user data at the data service level when uplink transmission is unlikely to be successful.

18 Claims, 10 Drawing Sheets

(56) References Cited

U.S. PATENT DOCUMENTS

| | | |
|---|---|---|
| 2007/0047437 A1 | 3/2007 | Bachl |
| 2008/0074999 A1 | 3/2008 | Usuda |
| 2008/0101323 A1 | 5/2008 | Zuniga |
| 2008/0253300 A1 | 10/2008 | Wakabayashi |
| 2008/0280615 A1* | 11/2008 | Vinayakray-Jani ........... 455/437 |
| 2009/0303977 A1 | 12/2009 | Hsu |
| 2010/0027504 A1 | 2/2010 | Ramamurthy |
| 2010/0226247 A1 | 9/2010 | Plamondon |
| 2010/0240385 A1 | 9/2010 | Löhr |
| 2010/0299703 A1* | 11/2010 | Altman ........................... 725/48 |
| 2011/0044196 A1 | 2/2011 | Ishii |
| 2011/0047286 A1 | 2/2011 | Harrang |
| 2011/0047287 A1 | 2/2011 | Harrang |
| 2011/0080868 A1 | 4/2011 | Krishnaswamy |
| 2011/0141959 A1 | 6/2011 | Damnjanovic |
| 2011/0228753 A1 | 9/2011 | Polito |
| 2011/0296064 A1 | 12/2011 | Ehsan |
| 2012/0002614 A1* | 1/2012 | Ekici et al. ..................... 370/329 |
| 2012/0021777 A1 | 1/2012 | Lazaridis |
| 2012/0099430 A1 | 4/2012 | Vos |
| 2012/0147755 A1* | 6/2012 | Chen et al. ..................... 370/242 |
| 2012/0155310 A1 | 6/2012 | Kreuzer |
| 2012/0178450 A1 | 7/2012 | Kuru |
| 2012/0307634 A1* | 12/2012 | Zhu ................................ 370/231 |
| 2014/0086050 A1* | 3/2014 | Swann et al. ................. 370/235 |

FOREIGN PATENT DOCUMENTS

| | | |
|---|---|---|
| EP | 2391175 A1 | 11/2011 |
| EP | 2427001 A1 | 7/2012 |

OTHER PUBLICATIONS

Orfanos G. et al: "An Adaptive MAC Protocol for MC-CDMA Adhoc Wireless LAN", Personal, Indoor and Mobile Radio Communications, 2005. PIMRC 2005. IEEE 16th International Symposium on Berlin, Germany, Sep. 11-14, 2005, Piscataway, NJ, USA, IEEE, vol. 4, Sep. 11, 2005, pp. 2734-2741.

Canadian Intellectual Property Office, Application No. 2827084, Mar. 19, 2015.

* cited by examiner

DATA SERVICE LEVEL UPLINK DATA FLOW CONTROL

FIELD OF THE APPLICATION

The application relates to wireless communication, and more particularly to uplink data flow control.

BACKGROUND

When user equipment (UE), such as a user terminal or mobile station, attempts to communicate in the uplink (UL) the UE consumes power to do so. If a user or application running on the UE is requesting data, the UE will generally try to connect to the network as often as the user/application generates such requests. This potentially wastes a significant amount of power, particularly if an uplink transmission attempt is initially unsuccessful, as in some cases further unsuccessful attempts may be made, thus consuming even more power. If the UE operates on battery power, the power consumption of such uplink transmission attempts may require more frequent battery re-charging.

BRIEF DESCRIPTION OF THE DRAWINGS

Embodiments will now be described with reference to the attached drawings in which.

DETAILED DESCRIPTION

Figure 1:
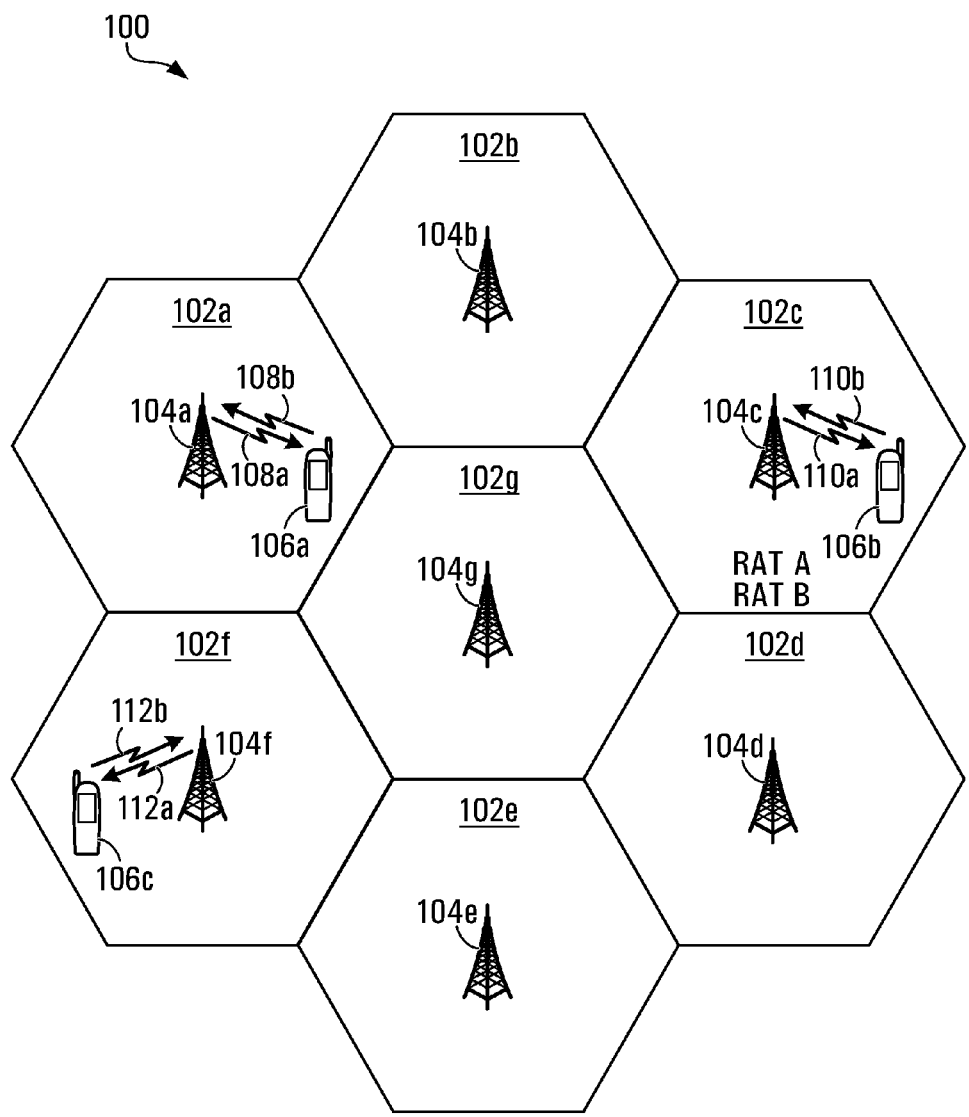
FIG. 1 is a block diagram of an example of a wireless network.

This disclosure provides various embodiments for data service level uplink data flow control. In particular, this disclosure provides embodiments for limiting uplink transmission for user data at the data service level. In the context of the current disclosure, the term user data is used to refer to Internet Protocol (IP) traffic, such as Transmission Control Protocol (TCP) traffic and User Datagram Protocol (UDP) traffic, and the data service level refers to processing done at the "socket" or IP processing layer. For example, in the OSI network model, the IP processing layer is below the application layer, but above the network layer. In some communications standard, such as the third generation partnership project (3GPP) and third generation partnership project 2 (3GPP2) standards, a protocol layer that is completely agnostic to what data it carries is represented below the network layer.

One aspect of the present disclosure provides a method in a mobile device, the method comprising: monitoring at least one characteristic related to uplink transmission; and limiting uplink transmission for user data at the data service level based at least in part on the at least one characteristic.

In some embodiments, the method further comprises determining whether uplink transmission is unlikely to be successful based at least in part on the at least one characteristic, wherein the limiting uplink transmission for user data at the data service level is responsive to determining that uplink transmission is unlikely to be successful.

In some embodiments, limiting uplink transmission for user data at the data service level comprises inhibiting non-emergency uplink transmission for user data at the data service level while permitting network-required uplink transmissions and emergency uplink transmissions.

In some embodiments, inhibiting uplink transmission for user data at the data service level comprises shutting off all non-emergency uplink transmissions for user data at the data service level.

In some embodiments, limiting uplink transmission for user data at the data service level comprises: permitting uplink transmission for user data responsive to detecting user interaction with the mobile device; and inhibiting uplink transmission for user data in the absence of detecting user interaction with the mobile device.

In some embodiments, detecting user interaction with the mobile device comprises at least one of: detecting use of at least one user input/output device of the mobile device; and detecting tethering of the mobile device.

In some embodiments, the user input/output device comprises at least one of: a touchscreen; an audio input device; and an audio output device.

In some embodiments, the method further comprises permitting uplink transmission for user data responsive to determining that uplink transmission is no longer unlikely to be successful based at least in part on the at least one characteristic.

In some embodiments, monitoring at least one characteristic related to uplink transmission comprises monitoring at least one of: switches between radio access technologies (RATs); a transmission power level for uplink transmission; a modulation scheme used for uplink transmission; a cell receive quality; and a result of past uplink transmissions.

In some embodiments, limiting uplink transmission for user data at the data service level based at least in part on the at least one characteristic comprises limiting uplink transmission for user data at the data service level based at least in part on switches between radio access technologies (RATs).

In some embodiments, limiting uplink transmission for user data at the data service level based at least in part on switches between radio access technologies (RATs) comprises determining the number of times the mobile device has switched RATs within a period of time.

In some embodiments, determining the number of times the mobile device has switched RATs within a period of time comprises determining the number of times the mobile device has switched from a higher order RAT to a lower order RAT within a period of time.

In some embodiments, the method further comprises: monitoring for a switch between RATs; responsive to identifying a switch between a previous RAT and a new RAT, determining if the new RAT is of a lower order than the previous RAT; and responsive to determining that the new RAT is of a lower order than the previous RAT, determining whether the number of times the mobile device has switched from a higher order RAT to a lower order RAT has occurred more than a predetermined number of times within a period of time.

In some embodiments, limiting uplink transmission for user data at the data service level based at least in part on switches between RATs comprises limiting uplink transmission for user data at the data service level based at least in part on whether the mobile device has switched from a higher order RAT to a lower order RAT more than a predetermined number of times within a period of time.

In some embodiments, a switch between a previous RAT and a new RAT that has not been recently active is not counted toward the number of times the mobile device has switched between a higher order RAT and a lower order RAT.

In some embodiments, monitoring at least one characteristic related to uplink transmission comprises monitoring a transmission power level for uplink transmission.

In some embodiments, monitoring a transmission power level for uplink transmission comprises tracking uplink power requests received by the mobile device and corresponding uplink transmission acknowledgements.

In some embodiments, tracking uplink power requests received by the mobile device and corresponding uplink transmission acknowledgements comprises tracking uplink power requests received in respect of uplink transmissions made for a random access channel (RACH) in idle mode of the mobile device.

In some embodiments, limiting uplink transmission for user data at the data service level based at least in part on the at least one characteristic comprises limiting uplink transmission for user data at the data service level based at least in part on whether a positive acknowledgement has not been received for a predetermined number of uplink transmissions made at the maximum transmission power of the mobile device.

In some embodiments, the method further comprises permitting uplink transmission for user data if at least one of the following occur: a positive acknowledgement for an uplink transmission is received; the mobile device changes cells; and user interaction is detected.

In some embodiments, monitoring a transmission power level for uplink transmission comprises tracking uplink power requests received by the mobile device and a corresponding uplink transmission modulation scheme.

In some embodiments, tracking uplink power requests received by the mobile device comprises tracking uplink power requests received in respect of uplink transmissions made for a dedicated data channel (DCH).

In some embodiments, limiting uplink transmission for user data at the data service level based at least in part on the at least one characteristic comprises limiting uplink transmission for user data at the data service level based at least in part on whether the requested uplink transmission power for the lowest uplink transmission modulation scheme is above a predetermined threshold for a predetermined period of time.

In some embodiments, the method further comprises determining if the mobile device is in any one of a low mobility environment and single cell coverage, wherein limiting uplink transmission for user data at the data service level is further based at least in part on whether the mobile device is in any one of a low mobility environment and single cell coverage.

In some embodiments, the method further comprises permitting uplink transmission for user data if at least one of the following occur: a request for an uplink transmission power below the predetermined threshold is received; the uplink transmission modulation scheme is increased; user interaction is detected; and a second predetermined amount of time elapses.

In some embodiments, monitoring at least one characteristic related to uplink transmission comprises monitoring cell receive quality of a serving cell, and limiting uplink transmission for user data at the data service level comprises limiting uplink transmission for user data at the data service level if at least one of the following occurs: the cell receive quality of the serving cell is below a predetermined threshold for a predetermined period of time; and the mobile device loses service coverage.

In some embodiments, the method further comprises permitting uplink transmission for user data if the cell receive quality of the serving cell rises above the predetermined threshold for a predetermined period of time.

In some embodiments, the method further comprises after previously limiting uplink transmission for user data due to loss of service coverage from a serving cell, continuing to limit uplink transmission for user data at the data service level if the mobile device returns to service coverage on the same serving cell.

In some embodiments, the method further comprises permitting uplink transmission for user data if the mobile device returns to service coverage on a different cell.

In some embodiments, monitoring at least one characteristic related to uplink transmission further comprises monitoring cell receive quality of at least one neighbor cell, and permitting uplink transmission for user data if the cell receive quality of at least one of the serving cell and the at least one neighbor cell is above the predetermined threshold for a predetermined period of time.

In some embodiments, the method further comprises determining if the mobile device is in any one of a low mobility environment and single cell coverage, wherein limiting uplink transmission for user data at the data service level is further based at least in part on whether the mobile device is in any one of a low mobility environment and single cell coverage.

In some embodiments, uplink transmission for user data is permitted if user interaction is detected.

In some embodiments, monitoring at least one characteristic related to uplink transmission comprises monitoring results of past uplink transmissions, and limiting uplink transmission for user data at the data service level based at least in part on the at least one characteristic comprises limiting uplink transmission for user data at the data service level based at least in part on the results of past uplink transmissions.

In some embodiments, monitoring results of past uplink transmissions comprises tracking radio link failure messages, and limiting uplink transmission for user data at the data service level based at least in part on the results of past uplink transmissions comprises limiting uplink transmission for user data at the data service level based at least in part on whether the number of radio link failure messages within a period of time exceeds a threshold.

In some embodiments, the method further comprises permitting uplink transmission for user data if at least one of the following occur: a successful radio link disconnect; the mobile device changes cells; and user interaction is detected.

In some embodiments, the method further comprises determining if the mobile device is in any one of a low mobility environment and single cell coverage, wherein limiting uplink transmission for user data at the data service level based at least in part on the results of past uplink transmissions is further based at least in part on whether the mobile device is in any one of a low mobility environment and single cell coverage.

In some embodiments, monitoring results of past uplink transmissions comprises tracking acknowledgement results for past uplink transmissions, and limiting uplink transmission for user data at the data service level based at least in part on the results of past uplink transmissions comprises limiting uplink transmission for user data at the data service level based at least in part on whether the rate of non-positive acknowledgements exceeds a threshold.

In some embodiments, the rate of non-positive acknowledgements comprises at least one of the rate of negative acknowledgements and the rate of non-acknowledgements.

In some embodiments, tracking acknowledgement results for past uplink transmissions comprises tracking acknowledgement results for at least one of: a) uplink access attempts made by the mobile device on an uplink random access channel (RACH) in idle mode; and b) uplink transmission of packet data units (PDUs) made by the mobile device in connected mode.

In some embodiments, the method further comprises permitting uplink transmission for user data if at least one of the following occur: the rate of positive acknowledgements exceeds a threshold; the mobile device changes cells; and user interaction is detected.

In some embodiments, the method further comprises determining if the mobile device is in any one of a low mobility environment and single cell coverage, wherein limiting uplink transmission for user data at the data service level is further based at least in part on whether the mobile device is in any one of a low mobility environment and single cell coverage.

Another aspect of the present disclosure provides a mobile device comprising: at least one antenna; a wireless access radio, functionally connected to the at least one antenna, configured to communicate with at least one wireless access network; a data service level uplink transmission controller configured to: monitor at least one characteristic related to uplink transmission; and limit uplink transmission for user data at the data service level based at least in part on the at least one characteristic.

In some embodiments, the data service level uplink transmission controller is further configured to: determine whether uplink transmission is unlikely to be successful based at least in part on the at least one characteristic, and limit uplink transmission for user data at the data service level responsive to determining that uplink transmission is unlikely to be successful.

In some embodiments, the data service level uplink transmission controller is configured to limit uplink transmission for user data by inhibiting non-emergency uplink transmission for user data at the data service level while permitting network-required uplink transmissions and emergency uplink transmissions.

In some embodiments, the data service level uplink transmission controller is configured to inhibit uplink transmission for user data at the data service level by shutting off all non-emergency uplink transmissions for user data at the data service level.

In some embodiments, the data service level uplink transmission controller is configured to permit uplink transmission for user data responsive to detecting user interaction with the mobile device.

In some embodiments, the data service level uplink transmission controller is configured to detect user interaction with the mobile device by detecting at least one of: use of at least one user input/output device of the mobile device; and tethering of the mobile device.

In some embodiments, the mobile device further comprises at least one of the following user input/output devices: a touchscreen; an audio input device; and an audio output device.

In some embodiments, the data service level uplink transmission controller is configured to permit uplink transmission for user data responsive to determining that uplink transmission is no longer unlikely to be successful based at least in part on the at least one characteristic.

In some embodiments, the data service level uplink transmission controller is configured to monitor at least one of the following characteristics related to uplink transmission: switches between radio access technologies (RATs); a transmission power level for uplink transmission; a modulation scheme used for uplink transmission; a cell receive quality; and a result of past uplink transmissions.

In some embodiments, the data service level uplink transmission controller is configured to limit uplink transmission for user data at the data service level based at least in part on switches between radio access technologies (RATs).

In some embodiments, the data service level uplink transmission controller is further configured to determine the number of times the mobile device has switched RATs within a period of time.

In some embodiments, the data service level uplink transmission controller is further configured to determine the number of times the mobile device has switched from a higher order RAT to a lower order RAT within a period of time.

In some embodiments, the data service level uplink transmission controller is further configured to: responsive to identifying a switch between a previous RAT and a new RAT, determine if the new RAT is of a lower order than the previous RAT; and responsive to determining that the new RAT is of a lower order than the previous RAT, determine whether the number of times the mobile device has switched from a higher order RAT to a lower order RAT has occurred more than a predetermined number of times within a period of time.

In some embodiments, the data service level uplink transmission controller is further configured to limit uplink transmission for user data at the data service level based at least in part on whether the mobile device has switched from a higher order RAT to a lower order RAT more than a predetermined number of times within a period of time.

In some embodiments, the data service level uplink transmission controller is configured to not count a switch between a previous RAT and a new RAT that has not been recently active toward the number of times the mobile device has switched between a higher order RAT and a lower order RAT.

In some embodiments, the data service level uplink transmission controller is configured to limit uplink transmission for user data at the data service level based at least in part on a transmission power level for uplink transmission.

In some embodiments, the data service level uplink transmission controller is configured to track the uplink power requests received by the mobile device and corresponding uplink transmission acknowledgements.

In some embodiments, the data service level uplink transmission controller is configured to track uplink power requests received in respect of uplink transmissions made for a random access channel (RACH) in idle mode of the mobile device.

In some embodiments, the data service level uplink transmission controller is configured to limit uplink transmission for user data at the data service level based at least in part on whether a positive acknowledgement has not been received for a predetermined number of uplink transmissions made at the maximum transmission power of the mobile device.

In some embodiments, the data service level uplink transmission controller is configured permit uplink transmission for user data if at least one of the following occur: a positive acknowledgement for an uplink transmission is received; the mobile device changes cells; and user interaction is detected.

In some embodiments, the data service level uplink transmission controller is configured to track uplink power requests received by the mobile device and a corresponding uplink transmission modulation scheme.

In some embodiments, the data service level uplink transmission controller is configured to track uplink power requests received in respect of uplink transmissions made for a dedicated data channel (DCH).

In some embodiments, the data service level uplink transmission controller is configured to limit uplink transmission for user data at the data service level based at least in part on whether the requested uplink transmission power for the lowest uplink transmission modulation scheme is above a predetermined threshold for a predetermined period of time.

In some embodiments, the data service level uplink transmission controller is further configured to: determine if the mobile device is in any one of a low mobility environment and single cell coverage; and limit uplink transmission for user data at the data service level based further at least in part on whether the mobile device is in any one of a low mobility environment and single cell coverage.

In some embodiments, the data service level uplink transmission controller is configured to permit uplink transmission for user data if at least one of the following occur: a request for an uplink transmission power below the predetermined threshold is received; the uplink transmission modulation scheme is increased; user interaction is detected; and a second predetermined amount of time elapses.

In some embodiments, wherein the data service level uplink transmission controller is configured to: monitor cell receive quality of a serving cell; and limit uplink transmission for user data at the data service level if at least one of the following occurs: the cell receive quality of the serving cell is below a predetermined threshold for a predetermined period of time; and the mobile device loses service coverage.

In some embodiments, the data service level uplink transmission controller is configured to permit uplink transmission for user data if the cell receive quality of the serving cell rises above the predetermined threshold for a predetermined period of time.

In some embodiments, the data service level uplink transmission controller is configured to continue to limit uplink transmission for user data at the data service level if the mobile device returns to service coverage on the same serving cell on which it lost service coverage.

In some embodiments, the data service level uplink transmission controller is configured to permit uplink transmission for user data if the mobile device returns to service coverage on a different cell.

In some embodiments, the data service level uplink transmission controller is configured to: monitor cell receive quality of at least one neighbor cell; and permit uplink transmission for user data if the cell receive quality of at least one of the serving cell and the at least one neighbor cell is above the predetermined threshold for a predetermined period of time.

In some embodiments, the data service level uplink transmission controller is configured to: determine if the mobile device is in any one of a low mobility environment and single cell coverage; and limit uplink transmission for user data at the data service level based further at least in part on whether the mobile device is in any one of a low mobility environment and single cell coverage.

In some embodiments, the data service level uplink transmission controller is configured to: detect user interaction with the mobile device; and permit uplink transmission for user data responsive to detecting user interaction.

In some embodiments, the data service level uplink transmission controller is configured to: monitor results of past uplink transmissions; and limit uplink transmission for user data at the data service level based at least in part on the results of past uplink transmissions.

In some embodiments, the data service level uplink transmission controller is configured to: track radio link failure messages; and limit uplink transmission for user data at the data service level based at least in part on whether the number of radio link failure messages within a period of time exceeds a threshold.

In some embodiments, the data service level uplink transmission controller is configured to permit uplink transmission for user data if at least one of the following occur: a successful radio link disconnect; the mobile device changes cells; and user interaction is detected.

In some embodiments, the data service level uplink transmission controller is configured to: determine if the mobile device is in any one of a low mobility environment and single cell coverage; and limit uplink transmission for user data at the data service level based further at least in part on whether the mobile device is in any one of a low mobility environment and single cell coverage.

In some embodiments, the data service level uplink transmission controller is configured to: track acknowledgement results for past uplink transmissions; and limit uplink transmission for user data at the data service level based at least in part on whether the rate of non-positive acknowledgements exceeds a threshold.

In some embodiments, the rate of non-positive acknowledgements comprises at least one of the rate of negative acknowledgements and the rate of non-acknowledgements.

In some embodiments, the data service level uplink transmission controller is configured to track acknowledgement results for at least one of: a) uplink access attempts made by the mobile device on an uplink random access channel (RACH) in idle mode; and b) uplink transmission of packet data units (PDUs) made by the mobile device in connected mode.

In some embodiments, the data service level uplink transmission controller is configured to permit uplink transmission for user data if at least one of the following occur: the rate of positive acknowledgements exceeds a threshold; the mobile device changes cells; and user interaction is detected.

In some embodiments, the data service level uplink transmission controller is configured to: determine if the mobile device is in any one of a low mobility environment and single cell coverage; and limit uplink transmission for user data at the data service level based further at least in part on whether the mobile device is in any one of a low mobility environment and single cell coverage.

Referring now to FIG. 1, shown is a block diagram of an example wireless network 100 in which embodiments of the present disclosure may be implemented. The wireless network 100 includes cells 102a-102g, each of which includes a respective access node 104a-104g. At the moment depicted in FIG. 1, a mobile device 106a is located in cell 102a, and mobile devices 106b and 106c are located in cells 102c and 102f respectively.

A base station is an example of an access node. In some embodiments, the wireless network 100 may be an E-UTRA network and access nodes 104a-104g may be eNBs (evolved Node Bs).

It is to be understood that wireless network 100, and the arrangement and number of elements included therein, including the cells 102a-102g, the access nodes 104a-104g and the mobile devices 106a-106c, is merely illustrative of one very specific example embodiment.

In operation, access nodes 104a-104g provide service coverage to cells 102a-102g respectively. As shown in FIG. 1, mobile device 106a receives downlink transmissions 108a from access node 104a and transmits uplink transmissions 108b to access node 104a. Similarly, mobile device 106b receives downlink transmissions 110a from access node 104c and transmits uplink transmissions 110b to access node 104c, while mobile device 106c receives downlink transmissions 112a from access node 104f and transmits uplink transmissions 112b to access node 104f. While the mobile devices 106a-106c are shown in FIG. 1 as respectively receiving downlink transmissions 108a, 110a, and 112a from, and respectively transmitting uplink transmissions 108b, 110b, and 112b to, access nodes 104a, 104c and 104f, in some embodiments a mobile device may receive downlink transmissions from more than one access node and may transmit uplink transmissions to more than one access node. In addition, in some embodiments a mobile device may transmit uplink transmissions to one or more access nodes that is/are different than one or more access nodes from which the mobile device receives downlink transmissions.

In accordance with an embodiment of this disclosure, a mobile device, such as mobile devices 106a-106c, monitors at least one characteristic related to uplink transmission and limits its uplink transmission for user data at the data service level based at least in part on the at least one characteristic.

Figure 2:
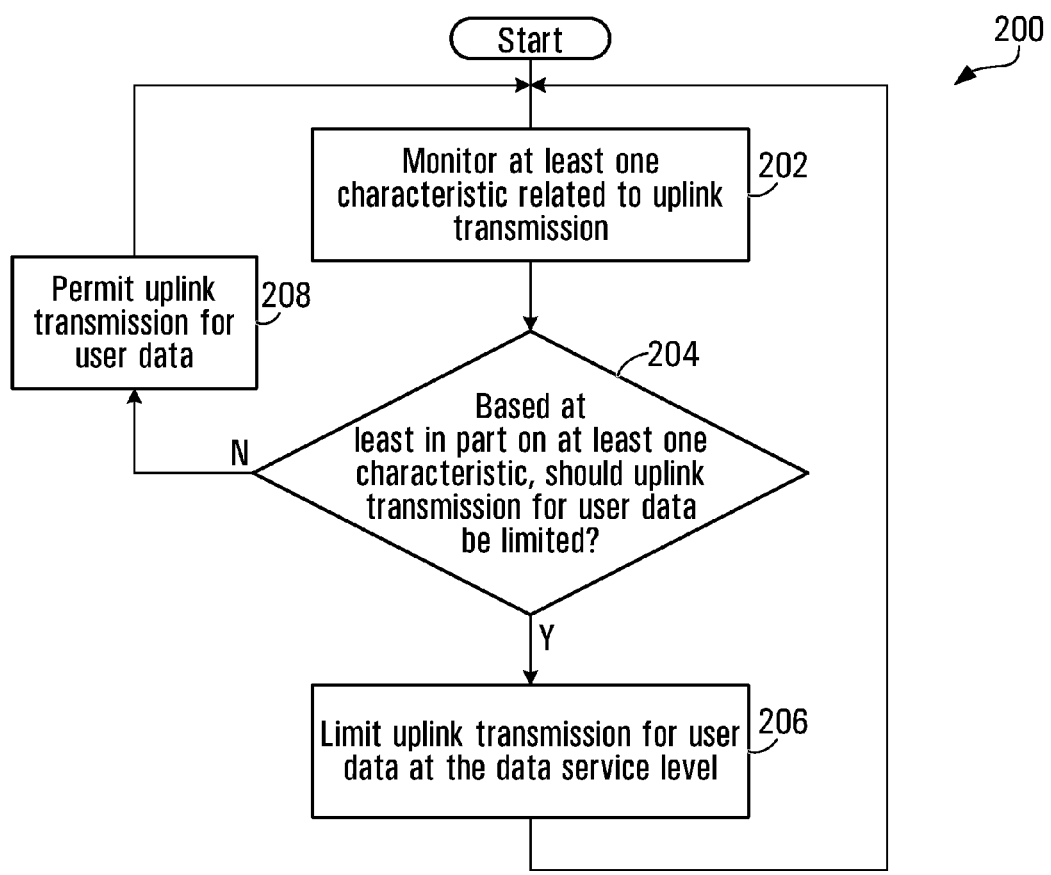
FIG. 2 is a flowchart of an example of a method of limiting uplink transmission for user data at the data service level based at least in part on at least one characteristic related to uplink transmission.

FIG. 2 is a flowchart of an example of a method 200 of limiting uplink transmission for user data at the data service level based at least in part on at least one characteristic related to uplink transmission. This method may be implemented in a mobile device, for example by the mobile devices 106a-106c shown in FIG. 1, or by the mobile devices 900 and 1000 shown in FIGS. 9 and 10, which will be discussed in detail later in this disclosure.

The method 200 begins at block 202, in which the mobile device monitors at least one characteristic related to uplink transmission. The mobile device then determines in block 204 whether uplink transmission for user data should be limited based at least in part on the at least one characteristic related to uplink transmission. If the mobile device determines at block 204 that uplink transmission for user data should be limited, then the method proceeds to block 206 (Yes path), in which the mobile device limits uplink transmission for user data at the data service level and the method returns to block 202 to continue monitoring the at least one characteristic related to uplink transmission. However, if the mobile device determines at block 204 that uplink transmission for user data should not be limited, then the method proceeds to block 208 (No path), in which the mobile device permits uplink transmission for user data and the method returns to block 202 to continue monitoring the at least one characteristic related to uplink transmission.

By implementing this functionality in a mobile device at the data service level, the functionality can potentially be implemented in a manner that is protocol agnostic; that is, because the functionality is implemented on the data service level, which is above the protocol level, it can potentially be implemented such that it is not dependent on specific implementation requirements of the protocol level. This means that the functionality can potentially be implemented such that it would not be impacted by changes at the protocol level. In some embodiments, implementation specific protocol characteristics given by the protocol level may be used in the decision to determine when to start and/or stop limiting uplink transmission for user data at the data service level. Accordingly, in some embodiments, the data service level processing may be changed to accommodate changes at the protocol level.

Furthermore, by monitoring at least one characteristic related to uplink transmission, it may be possible to determine circumstances/scenarios in which uplink transmission is unlikely to be successful. In some cases, it may be desirable to limit uplink transmissions for user data when such transmissions are unlikely to be successful. Accordingly, in some embodiments, the method 200 further includes determining whether uplink transmission is unlikely to be successful based at least in part on the at least one characteristic related to uplink transmission, wherein limiting uplink transmission for user data at the data service level in block 206 is responsive to determining that uplink transmission is unlikely to be successful.

In some cases, it may be desirable to limit uplink transmissions for user data without limiting network-required uplink transmissions and emergency uplink transmissions. Accordingly, in some embodiments, limiting uplink transmission for user data at the data service level in block 206 includes inhibiting uplink transmission for user data while permitting network-required uplink transmissions and emergency uplink transmissions. As such, it should be understood that such embodiments provide a framework to shut off or inhibit uplink transmissions for user data at the data service level, while ensuring that any network required transmissions and emergency transmissions can still occur, thereby essentially throttling the uplink data to potentially save power and avoid transmitting user data early until the mobile device is more likely to be able to transmit successfully.

In some embodiments, inhibiting uplink transmission for user data at the data service level in block 206 includes shutting off all uplink transmissions for user data at the data service level, whereas in other embodiments uplink transmission may be limited for some user data, while being permitted for other user data. For example, user data for certain applications may be prioritized over user data for other applications, such that uplink transmission for user data for certain applications is permitted, while uplink transmission for user data for the other applications is limited.

In some embodiments, uplink transmission for user data is permitted if user interaction with the mobile device is detected. A user may interact with a mobile device in various ways. For example, a user may listen to streaming music or watch streaming video using the mobile device. In some cases, if the screen of the mobile device is on and/or the mobile device is playing streaming audio and/or if the mobile device is wirelessly tethered to a Wi-Fi hotspot, the user may not want uplink transmission for user data to be limited under such conditions. Accordingly, in some embodiments a mobile device may not inhibit uplink transmission for user data if the mobile device detects user interaction.

Some non-limiting examples of characteristics related to uplink transmission that may be monitored in some embodiments include switches between radio access technologies, transmission power levels for uplink transmissions, modulation schemes used for uplink transmission, cell receive quality of serving and/or neighbor cells and results of previous uplink transmissions, such as the number of radio link failure messages within a period of time and/or the rate of non-positive acknowledgements within a period of time. Illustrative examples of implementations of the method 200 shown in FIG. 2 adapted to limit uplink transmission for user data at the data service level based on each of the foregoing examples of characteristics will now be described with reference to the flowcharts shown in FIGS. 3 to 8 and the wireless network 100 shown in FIG. 1.

Typically when a mobile device is on the edge of coverage for a specific radio access technology (RAT) the device can ping-pong between RATs causing excessive power drain. This power drain may be accelerated when the device is attempting to transmit data as the communication channel is under increased scrutiny. Some embodiments of this disclosure may avoid unnecessary uplink transmissions for user data by limiting uplink transmission for background user data based on the monitoring of RAT selection and hysteresis at the service level.

Figure 3:
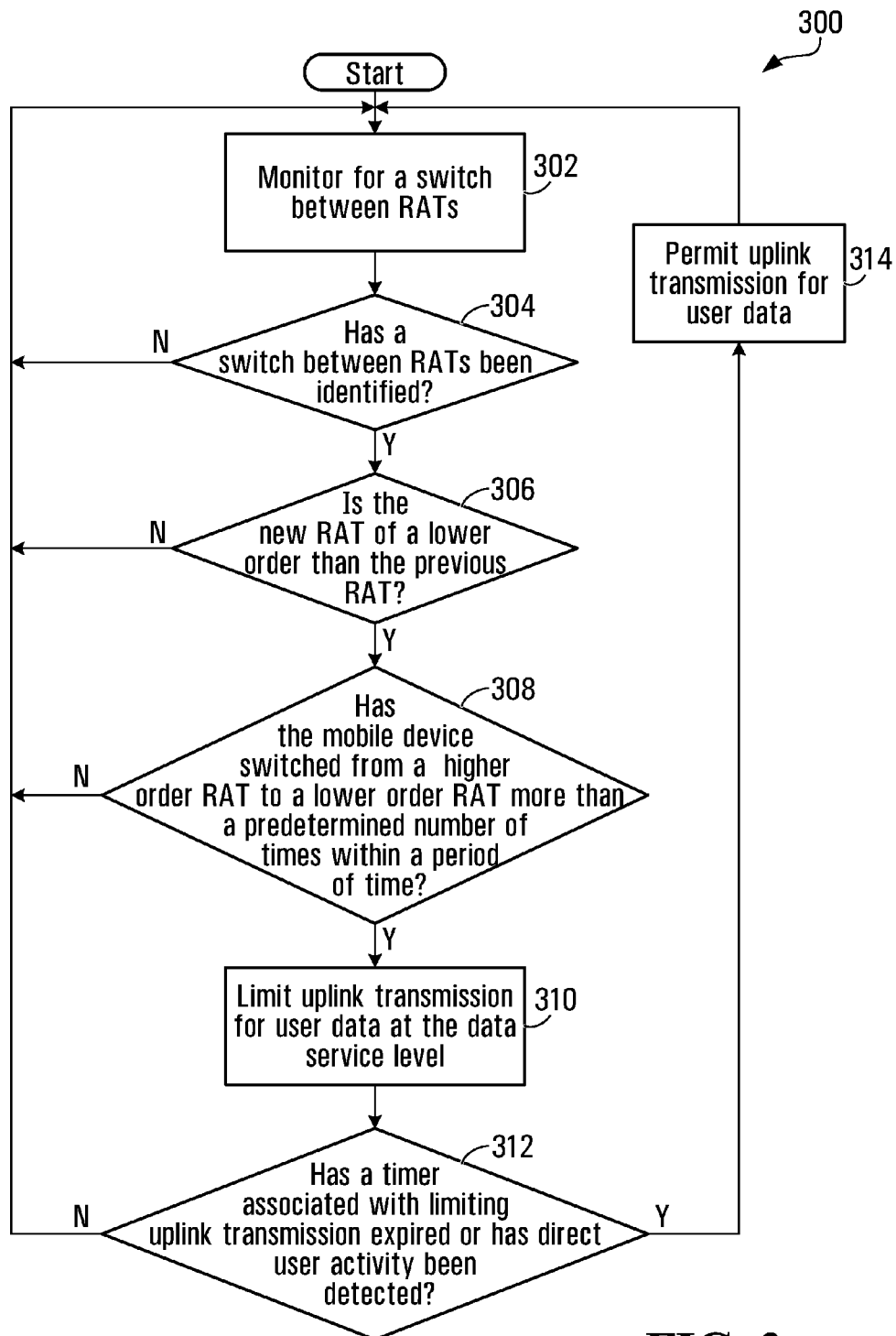
FIG. 3 is a flowchart of an example of a method of limiting uplink transmission for user data at the data service level based at least in part on switches between radio access technologies.

FIG. 3 is a flowchart of an example of a method 300 of limiting uplink transmission for user data at the data service level based at least in part on switches between radio access technologies (RATs).

The method 300 begins at block 302, in which the mobile device monitors for a switch between RATs. Referring again to FIG. 1, for illustrative purposes it is assumed that mobile device 106*b* is a multi-mode device that is capable of utilizing two radio access technologies, namely RAT A and RAT B, both of which are potentially available to mobile device 106*b* within cell 102*c*. Non-limiting examples of RATs that may be utilized in some embodiments of the present disclosure include GSM, UMTS/CDMA, LTE and LTE-A. For illustrative purposes it will be assumed that RAT A is a higher order RAT, such as LTE, and RAT B is a lower order RAT, such as GSM.

If, based on the monitoring at block 302, a switch between RATs is identified at block 304, for example, if the mobile device 106*b* switches from RAT A to RAT B or vice versa, then the method proceeds to block 306 (Yes path). Otherwise, the method returns to block 302 (No path) to continue monitoring for a switch between RATs.

In block 306 it is determined whether the switch was from a higher order RAT to a lower order RAT. If not, for example if the mobile device 106*b* switches from RAT B (assumed to be a lower order RAT) to RAT B (assumed to be a higher order RAT), then the method returns to block 302 (No path) to continue monitoring for a switch between RATs. Otherwise, if the switch has been from a higher order RAT to a lower order RAT, which in some cases may suggest that uplink transmission is less likely to be successful, then the method proceeds to block 308 (Yes path).

In block 308, if the mobile device has switched from a higher order RAT to a lower order RAT more than a predetermined number of times within a period of time, then the method proceeds to block 310 (Yes path). Otherwise, the method returns to block 302 (No path) to continue monitoring for a switch between RATs.

In block 310, the mobile device limits uplink transmission for user data at the data service level as described previously. For example, in some embodiments, if the mobile device determines in block 308 that it has switched from a higher order RAT to a lower order RAT two or more times within two minutes, it may proceed to block 310 and limit uplink transmission for user data. Otherwise, the mobile device may continue monitoring for a switch between RATs. The threshold of two or more times within two minutes is merely an example of one potential threshold for the check performed in block 308. In some embodiments, the threshold number of switches may be higher or lower than the particular example given and may be based on a shorter or longer period of time.

By operating in accordance with the method illustrated in the flow chart of FIG. 3, if the mobile device 106*b* has repeatedly switched from RAT A to RAT B more than a predetermined number of times with a certain period of time, which may suggest that the mobile device 106B is at or near the edge of coverage for RAT A and/or RAT B and thus may not be able to successfully transmit to the network, then the mobile device 106B limits uplink transmission for user data at the data service level.

In some embodiments, when the mobile device limits uplink transmission for user data in block 310 it only does so for a certain period of time before once again permitting uplink transmission for user data. In some cases, the mobile device may start a timer when it begins limiting uplink transmission. If the timer expires, then the mobile device may again permit uplink transmission for user data. In some embodiments the mobile device may also permit uplink transmission for user data if user interaction is detected.

In the method 300 shown in FIG. 3, once the mobile device has limited uplink transmission for user data in block 310, the method proceeds to block 312, in which the mobile device determines if a timer associated with limiting uplink transmission has expired or if direct user activity has been detected. If neither of these has occurred, the method returns to block 302 (No path) to continue monitoring for a switch between RATs. Otherwise, if the timer has expired and/or if direct user activity has been detected, then the method proceeds to block 314, in which uplink transmission for user data is permitted and the method then returns to block 302 to continue monitoring for a switch between RATs.

In some embodiments, the method 300 includes an additional block between blocks 306 and 308 in which the mobile device checks if the new RAT has been active in the recent past. Is some embodiments the mobile device may retain a history of recently active RATs and the mobile device may check this history to determine if the new RAT is included in the history. In some embodiments, if the new RAT has not been active in the recent past, then the mobile device may return to block 302 to continue monitoring for a switch between RATs, which, in effect means that a switch between a previous RAT and a new RAT that has not been recently active is not counted toward the number of times the mobile device has switched between a higher order RAT and a lower order RAT.

In some cases a mobile device may retain a history of recently active cells. This may, for example, be maintained as part of a cell history. In some embodiments, after determining that the new RAT is of a lower order than the previous RAT in block 306 the mobile device may also check to see if the cell on the new RAT was active in the recent past to narrow mobility aspects. If not, then the mobile device may return to block 302 to continue monitoring for a switch between RATs. Otherwise, the switch to the new RAT may be counted toward the number of times the mobile device has switched between a higher order RAT and a lower order RAT in block 308.

To illustrate this operation by way of example, reference is made again to FIG. 1 and it is assumed that the mobile device 106b has switched from RAT A (assumed to be a higher order RAT) to RAT B (assumed to be a lower order RAT) while receiving service from cell 102c. For illustrative purposes it is further assumed that the mobile device 106b maintains a history of recently active RATs and cells. Accordingly, it is assumed that this history identifies cell 102c as a recently active cell and RAT A and RAT B as recently active RATs. If, for the sake of illustration, it is assumed that the mobile device is handed over from cell 102c to cell 102d and switches from RAT A on cell 102c to RAT B on cell 102d, then that switch may not be counted as a switch from a higher order RAT to a lower order RAT if the mobile device has not been previously active on cell 102d in the recent past.

The method illustrated in the flowchart of FIG. 3 is merely exemplary. The steps of the method may be re-ordered and/or steps may be added or removed. For example, in some embodiments, the flowchart may include a check for user interaction between blocks 308 and 310, such that the mobile device checks for user interaction with the mobile device following the yes path from block 308, and if user interaction is detected the method returns to block 302 and the mobile continues to monitor for a switch between RATs. Otherwise, if user interaction is not detected following block 308, the method proceeds to block 310 and uplink transmission for user data is limited.

The method implemented by the flowchart shown in FIG. 3 uses an analysis of switches between RATs to determine when to permit or limit uplink transmission for user data. Other embodiments utilize an analysis of the transmit power used for uplink transmissions to do the same, as discussed below.

Radio networks typically provide asymmetrical links between user equipment and network. Being in good conditions in downlink does not guarantee that uplink conditions are good or that uplink transmissions will be successful.

If a mobile device is already transmitting at its maximum transmission power, any indication the network is still requesting more power could indicate that service level user data is unlikely to be received correctly at the network side in a timely manner. Therefore it may be desirable under such circumstances to limit uplink transmission for user data. Doing so may prevent uplink transmissions for background service level data requests of applications which are typically responsible for frequent retransmission requests. In addition, since standardized radio traffic may continue irrespective of user data, once power levels requested for standardized radio traffic drop below a threshold value then uplink transmission for user data could be re-permitted. Uplink transmission for user data could also be re-permitted if critical user requests are made, as indicated by the detection of direct user interaction, e.g. the screen of the mobile device is on and/or the mobile device is wirelessly tethered to an access point. As such, statistics based on the current power being used to transmit data in the uplink (for example on a random access channel (RACH) type channel, or a dedicated/shared data channel) could potentially be used as a basis for determining when to limit uplink transmission attempts for service level user data when uplink conditions may be unfavorable.

Examples of methods of limiting uplink transmission for user data based on the foregoing concepts will now be described with reference to FIGS. 4 and 5.

Figure 4:
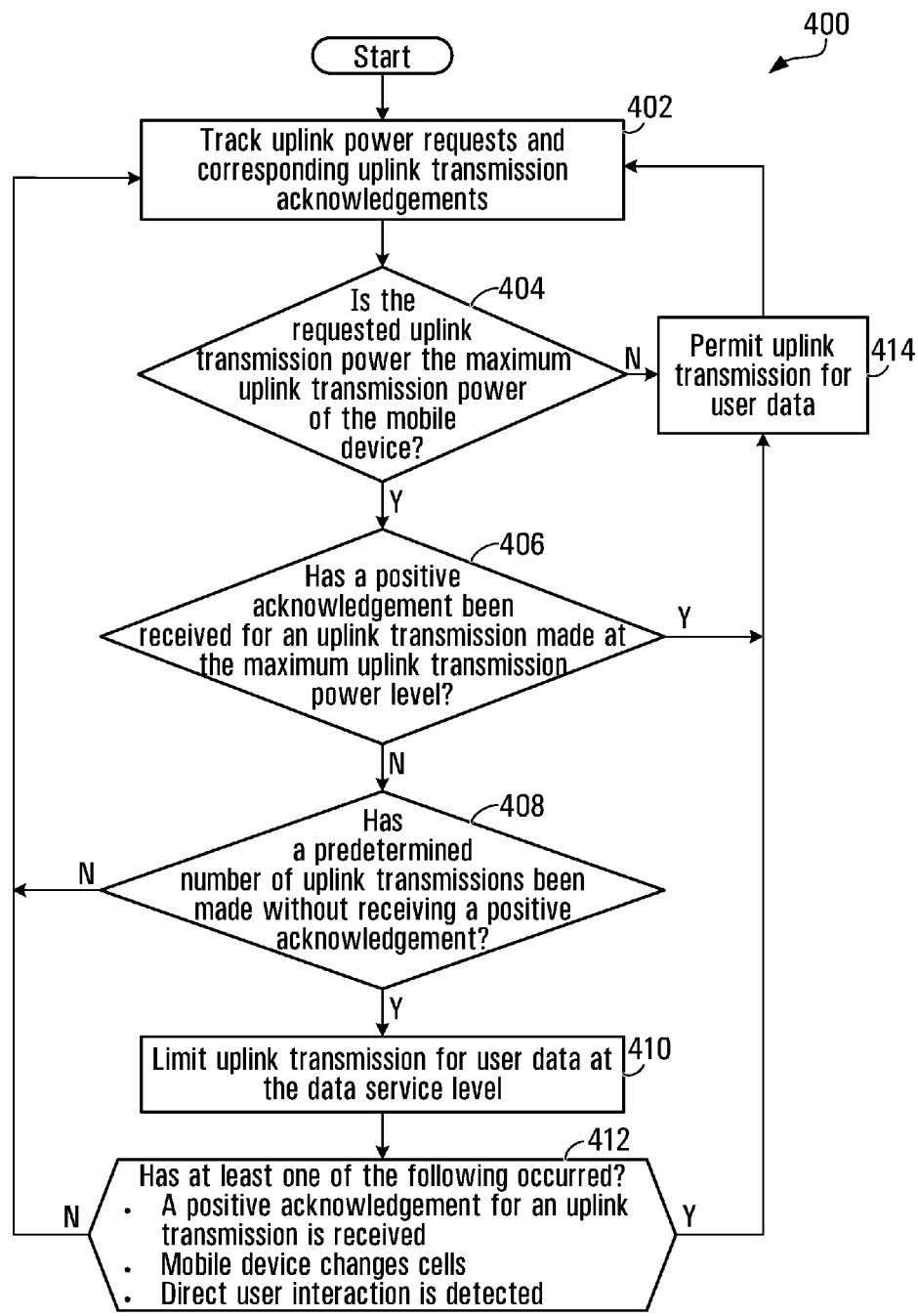
FIG. 4 is a flowchart of a first example of a method of limiting uplink transmission for user data at the data service level based at least in part on a transmission power level for uplink transmission.

FIG. 4 is a flow chart of a method 400 of limiting uplink transmission for user data at the data service level based at least in part on a transmission power level for uplink transmission. In particular, the method 400 implemented by the flowchart shown in FIG. 4 tracks uplink power requests and corresponding acknowledgements and limits uplink transmission for user data at the data service level based at least in part on the results of that tracking.

The method 400 begins at block 402, in which uplink power requests and corresponding uplink transmission acknowledgements for uplink transmissions made in accordance with those requests are tracked. Referring again to FIG. 1, for illustrative purposes it is assumed that the mobile device 106a is tracking uplink transmission power requests and corresponding positive acknowledgements that it receives from access node 104a via downlink transmission 108a.

From block 402 the method proceeds to block 404, in which it is determined whether a requested uplink transmission power is the maximum uplink transmission power of the mobile device. For example, the mobile device 106a checks whether the access node 104a is requesting the mobile device to transmit at the mobile devices maximum uplink transmission power level. If not, the method proceeds to block 414 (No path), in which uplink transmission for user data is permitted and the method returns to block 402 to continue tracking uplink power requests and corresponding uplink transmission acknowledgements. Otherwise, if the requested uplink transmission power corresponds to the maximum uplink transmission power of the mobile device (i.e. the network is requesting that the mobile device transmit with its maximum possible transmission power), the method proceeds to block 406 (Yes path).

In block 406, the mobile device checks whether a positive acknowledgement has been received for an uplink transmission made at the maximum uplink transmission power level. For example, if the uplink transmission 108b from mobile device 106a to access node 104a is made at the maximum transmit power level of the mobile device, mobile device 106a checks whether it has received a positive acknowledgement from access node 104a. If a positive acknowledgement has been received, the method proceeds to block 414 (Yes path) and uplink transmission for user data is permitted. Otherwise, if a positive acknowledgement has not been received, the method proceeds to block 408 (No path).

In some embodiments, the check performed in block 406 may be based on more than just a single positive acknowledgement. For example, in some embodiments the mobile device may check whether a majority of acknowledgements, or some other predetermined percentage of acknowledgements, within a period of time have been positive. For example, in some embodiments, the mobile device may proceed along the yes path from block 406 to block 414 if the mobile device determines in block 406 that the majority of acknowledgements within a period of time have been positive. Otherwise, if the majority of acknowledgements within a period of time have been non-positive, then the mobile device may proceed along the no path from block 406 to block 408.

In block 408, the mobile device checks whether a predetermined number of uplink transmissions have been made without receiving a positive acknowledgement. For example, the mobile device 106a checks whether it has made a predetermined number of back-to-back uplink transmissions 108b to access node 104a at its maximum transmit power level without receiving a positive acknowledgement. If not, the method returns to block 402 (No path) to continue tracking uplink power requests and corresponding uplink transmission acknowledgements. Otherwise, if it is determined in block 408 that a predetermined number of uplink transmissions have been made without receiving a positive acknowledgement, the method proceeds to block 410, in which the mobile device limits uplink transmission for user data at the data service level. For example, in some embodiments, if the mobile device determines in block 408 that it has made 10 or more uplink transmission attempts at its maximum uplink transmission power without receiving a positive acknowledgement, it may proceed to block 410 and limit uplink transmission for user data. Otherwise, the mobile device may continue tracking uplink power requests and corresponding uplink transmission acknowledgements. The threshold of ten or more uplink transmission attempts without a positive acknowledgement is merely an example of one potential threshold for the check performed in block 408. In some embodiments, the threshold number may be higher or lower than the particular example given.

In the method 400 shown in FIG. 4, once the mobile device has limited uplink transmission for user data in block 410, the method proceeds to block 412, in which the mobile device checks for positive acknowledgements, handoff of the mobile device and/or direct user interaction. If any of the foregoing occurs, the method proceeds to block 414 (Yes path) and the mobile device permits uplink transmission for user data. Otherwise, the method returns to block 402 (No path) to continue tracking uplink power requests and corresponding uplink transmission acknowledgements.

In some embodiments, tracking uplink power requests and corresponding uplink transmission acknowledgements in block 402 comprises tracking uplink power requests received in respect of uplink transmissions made for the random access channel (RACH) in idle mode of the mobile device.

The method illustrated in the flowchart of FIG. 4 is merely exemplary. The steps of the method may be re-ordered and/or steps may be added or removed. For example, in some embodiments, the flowchart may include a check for user interaction between blocks 408 and 410, such that the mobile device checks for user interaction with the mobile device following the yes path from block 408, and if user interaction is detected the method returns to block 402 and the mobile device continues to track uplink power requests and corresponding uplink transmission acknowledgements. Otherwise, if user interaction is not detected following block 408, the method proceeds to block 410 and uplink transmission for user data is limited.

Figure 5:
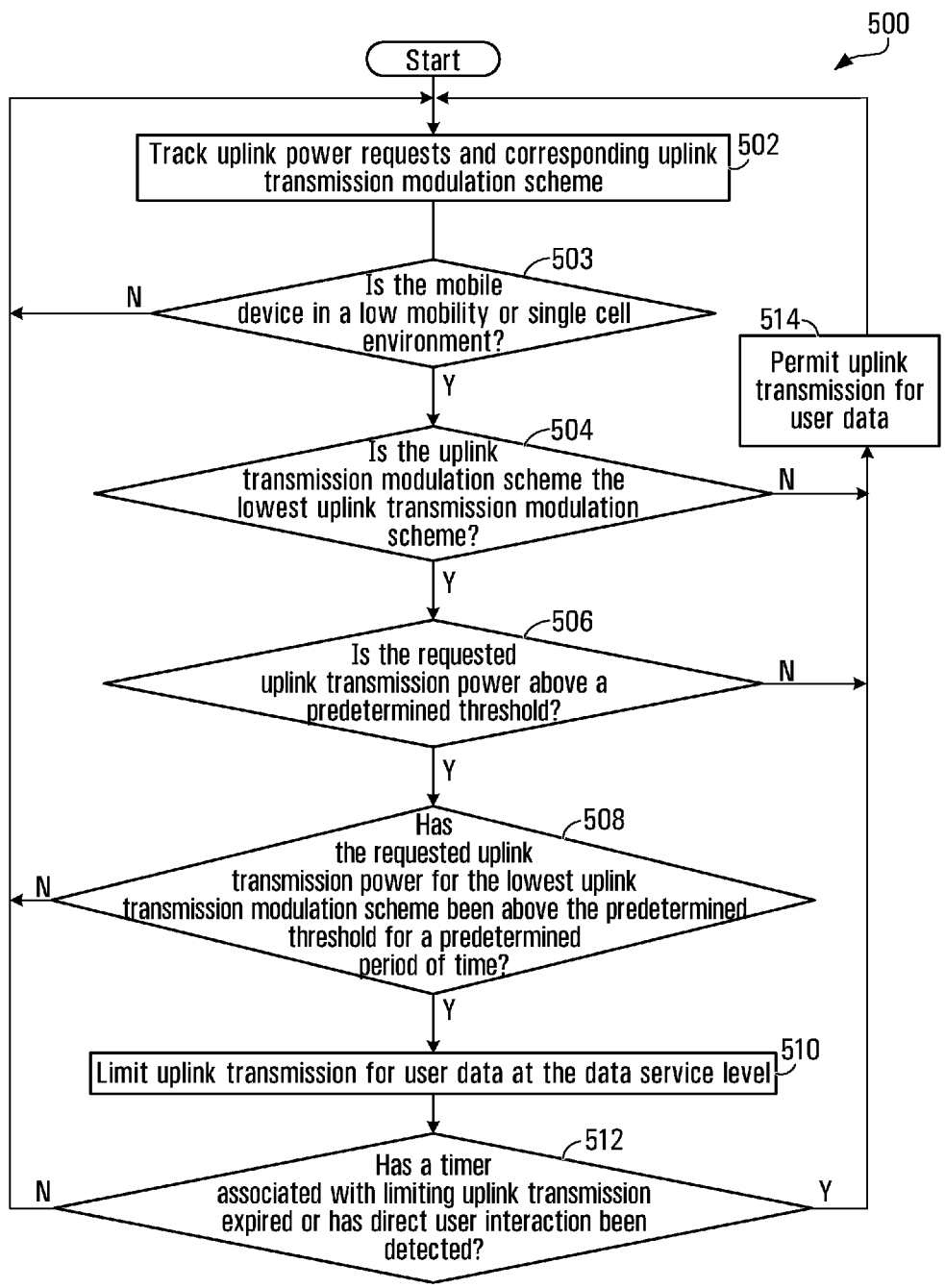
FIG. 5 is a flowchart of a second example of a method of limiting uplink transmission for user data at the data service level based at least in part on a transmission power level for uplink transmission.

FIG. 5 is a flow chart of another example of a method 500 of limiting uplink transmission for user data at the data service level based at least in part on a transmission power level for uplink transmission. In particular, the method 500 implemented by the flowchart shown in FIG. 5 tracks uplink power requests and corresponding uplink transmission modulation schemes and limits uplink transmission for user data at the data service level based at least in part on the results of that tracking.

The method 500 begins at block 502, in which uplink power requests and corresponding uplink transmission modulation schemes for uplink transmissions made in accordance with those requests are tracked. Referring again to FIG. 1, for illustrative purposes it is assumed that the mobile device 106a is tracking uplink transmission power requests that it receives from access node 104a via downlink transmission 108a and the corresponding modulation schemes that it is to use for uplink transmissions.

From block 502 the method proceeds to block 503, in which the mobile device determines if it is in a low mobility or single cell environment. The mobile device may make such a determination, for example, by monitoring for the presence and/or quality of cells. A single cell environment is one in which there is only a single cell visible to the mobile device, whereas in a low mobility environment there may be a few neighbor cells visible to the mobile device, but the mobile device is receiving relatively poor signal strengths from those cells. The determination of what constitutes relatively poor received signal strength is an implementation specific detail. In some embodiments, the threshold for determining that a received signal strength is relatively poor is the same as the threshold for determining whether a particular cell is a candidate for handoff. If the mobile device determines in block 503 that it is not in a low mobility or single cell environment, the method returns to block 502 (No path) to continue to track uplink power requests and corresponding uplink transmission modulation schemes. Otherwise, if the mobile device determines that it is in a limited mobility or single cell environment in block 503, then the method proceeds to block 504 (Yes path).

To illustrate this operation by way of example, reference is made again to FIG. 1, in which mobile device 106a currently has cell 102a as its serving cell. If, for the sake of illustration, it is further assumed that cells 102b, 102d and 102g are visible to mobile device 106a as neighbor cells (NCELLs), and currently have relatively good cell receive qualities (for example, with cell receive qualities above a predetermined threshold), as reflected, for example, in their respective Received Signal Strength Indicator (RSSI), Received Signal Code Power (RSCP) or Reference Signal Received Quality (RSRQ) values, then in some embodiments mobile device 106a may determine that it is not currently in a low mobility or single cell environment and, as such, may further execute the method 500 following the No path from block 503 to block 502 and continue to track uplink power requests and corresponding uplink transmission modulation schemes.

In contrast, if it is assumed that multiple cells, such as cells 102b, 102f and/or 102g, are visible to mobile device 106a as neighbor cells with relatively poor cell receive qualities (for example, with cell receive qualities below a predetermined threshold), then in some embodiments mobile device 106a may determine that it is currently in a low mobility environment and, therefore, may further execute the method 500 following the Yes path from block 503 to block 504.

In block 504, the mobile device checks whether the modulation scheme for a particular uplink transmission is set to the lowest uplink transmission modulation scheme. In some embodiments, the lowest uplink transmission modulation scheme is the modulation scheme with the lowest data rate. For example, the mobile device 106a may check whether the modulation scheme for an uplink transmission 108b to the access node 104a is set to the uplink transmission modulation scheme with the lowest data rate. If not, the method proceeds to block 514 (No path), in which uplink transmission for user data is permitted and the method returns to block 502 to continue tracking uplink power requests and corresponding uplink transmission modulation schemes. Otherwise, if the modulation scheme for the uplink transmission corresponds to the lowest uplink transmission modulation scheme, the method proceeds to block 506 (Yes path).

In block 506 it is determined whether a requested uplink transmission power is above a predetermined threshold. For example, the mobile device 106a may check whether the access node 104a is requesting the mobile device to transmit at near its maximum uplink transmission power level. If not, the method proceeds to block 514 (No path), in which uplink transmission for user data is permitted and the method returns to block 502 to continue tracking uplink power requests and corresponding uplink transmission modulation schemes.

Otherwise, if the requested uplink transmission power is above the predetermined threshold, the method proceeds to block 508 (Yes path).

In some embodiments, the predetermined threshold in block 506 may be set to an uplink transmission power that is near the maximum transmission power of the mobile device. For example, in some embodiments, the threshold may be set 1 dB below the maximum uplink transmission power of the mobile device.

In block 508, the mobile device checks whether the requested uplink transmission power for the lowest uplink transmission modulation scheme has been above the predetermined threshold for a predetermined period of time. For example, the mobile device 106a may check whether the access node 104a has been requesting the mobile device to transmit with an uplink transmission power that is above the threshold value for longer than the predetermined period of time for uplink transmissions using the lowest modulation scheme. If not, the method returns to block 502 (No path) to continue tracking uplink power requests and corresponding uplink transmission modulation schemes. Otherwise, the method proceeds to block 510, in which the mobile device limits uplink transmission for user data at the data service level.

In some embodiments, the predetermine period of time used in the check performed in block 508 may be on the order of a few seconds, e.g. 1-3 seconds. However, this is merely an example of one potential period of time that may be used in some embodiments. In other embodiments a longer or shorter period of time may be used.

In some embodiments, when the mobile device limits uplink transmission for user data in block 510 it only does so for a certain period of time before once again permitting uplink transmission for user data. In some cases, the mobile device may start a timer when it begins limiting uplink transmission. If the timer expires, then the mobile device may again permit uplink transmission for user data. In some embodiments the mobile device may also permit uplink transmission for user data if user interaction is detected.

In the method 500 shown in FIG. 5, once the mobile device has limited uplink transmission for user data in block 510, the method proceeds to block 512, in which the mobile device checks for expiry of a timer associated with limiting uplink transmission and/or direct user interaction. If either of these occurs, the method proceeds to block 514 (Yes path) and the mobile device permits uplink transmission for user data. Otherwise, the method returns to block 502 (No path) to continue tracking uplink power requests and corresponding uplink transmission modulation schemes.

In some embodiments, tracking uplink power requests and corresponding uplink transmission modulation schemes in block 502 comprises tracking uplink power requests received in respect of uplink transmissions made for the dedicated data channel (DCH).

The method illustrated in the flowchart of FIG. 5 is merely exemplary. The steps of the method may be re-ordered and/or steps may be added or removed. For example, in some embodiments, the flowchart may include a check for user interaction between blocks 508 and 510, such that the mobile device checks for user interaction with the mobile device following the yes path from block 508, and if user interaction is detected the method returns to block 502 and the mobile device continues to track uplink power requests and corresponding uplink transmission modulation schemes. Otherwise, if user interaction is not detected following block 508, the method proceeds to block 510 and uplink transmission for user data is limited.

The methods implemented by the flowcharts shown in FIGS. 4 and 5 use analyses based on tracking the transmit power used for uplink transmissions to determine when to permit or limit uplink transmission for user data. Other embodiments utilize an analysis of the cell receive quality of serving and/or neighbor cells to do the same, as discussed below.

Typically edge of cell and boundary conditions are where devices can become stuck sending and resending the same information to a network. By using statistical analysis of neighbor cell (NCELL) location/strengths in the recent history it may be possible to determine the likelihood that user data at the service layer will be successfully sent. By adding tracking and hysteresis measurements to a current NCELL listing it may be possible to indentify scenarios where a mobile device is ping-ponging in and out of coverage.

By limiting uplink transmission for user data while in these areas, extraneous attempts to transmit to the network can potentially be avoided. If the limiting is done at the data service level, required protocol traffic would still be sent as normal, and if critical user data was detected, as indicated by the detection of direct user interaction, e.g. the screen of the mobile device is on and/or the mobile device is wirelessly tethered to an access point, the limiting could be lifted to ensure responsiveness to user requests.

Examples of methods of limiting uplink transmission for user data based on the foregoing concepts will now be described with reference to FIG. 6.

Figure 6:
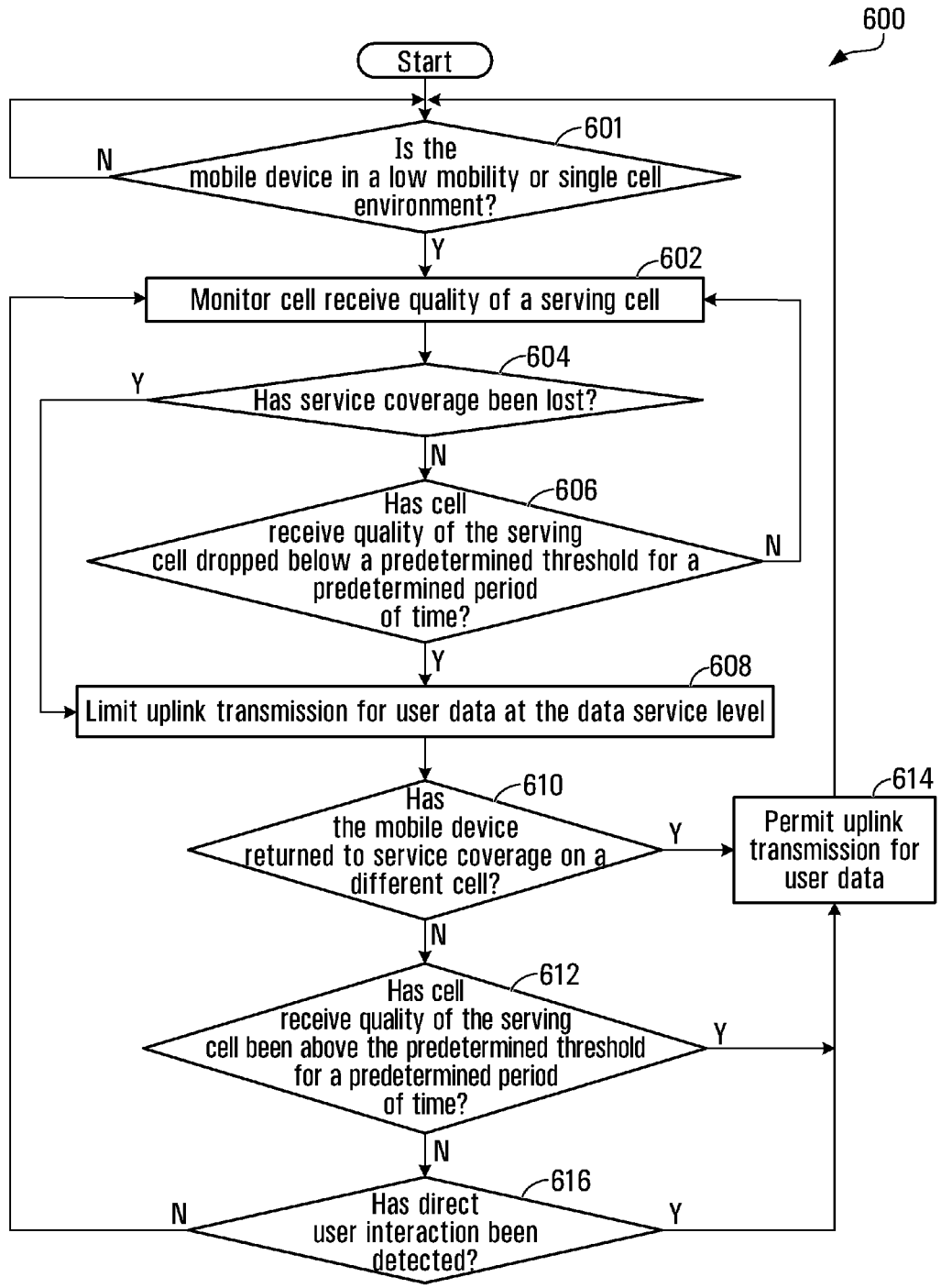
FIG. 6 is a flowchart of an example of a method of limiting uplink transmission for user data at the data service level based at least in part on cell receive quality.

FIG. 6 is a flowchart of an example of a method 600 of limiting uplink transmission for user data at the data service level based at least in part on cell receive quality. In particular, the method 600 implemented by the flowchart shown in FIG. 6 monitor cell receive quality of a serving cell and, in some cases, neighbor cells and limits uplink transmission for user data at the data service level if the cell receive quality of the cell is below a predetermined threshold for a predetermined period of time and/or if the mobile device loses service coverage. Referring again to FIG. 1, for illustrative purposes it is assumed that the mobile device 106c has access node 104f as its serving cell and is tracking receive quality of access node 104f and any other neighbor cells, such as cells 102a, 102g and 102e that may be visible to it.

The method 600 begins at block 601, in which the mobile device determines if it is currently in a low mobility or single cell environment. If so, the method proceeds to block 602 (Yes path). If not, the mobile device continues to check whether it is currently in a low mobility or single cell environment (No path). When the mobile device is not in a low mobility or single cell environment, it is possible that the mobile device may perform cell selection and change to a different cell or RAT. As such, in some cases, as long as the mobile device continues to not be located in a low mobility or single cell environment it may be preferable to continue to permit uplink transmissions for user data even if the quality of a currently serving cell temporarily degrades, because it is possible that the mobile device may be handed off to a different cell or RAT on which conditions might be better.

In block 602, cell receive quality of a serving cell is monitored, and the method proceeds to block 604. The cell receive quality may be indicated by the RSSI, RSCP, RSRQ or any other indicator of the quality of a downlink signal from the cell that was received at the mobile device. In some embodiments, the cell receive quality of neighbor cells (if present) is also monitored.

In block 604, the mobile device checks if service coverage has been lost. Losing service coverage means that the mobile device is no longer able to receive the signals transmitted by the network. This may occur, for example, if the mobile device moves into an area where the serving cell is unable to provide adequate coverage to successfully transmit to the mobile device. If service coverage has been lost, the method proceeds to block 608 (Yes path), in which the mobile device limits uplink transmission for user data at the data service level. Otherwise, if service coverage has not been lost, the method proceeds to block 606 (No path).

To illustrate this operation by way of example, reference is made again to FIG. 1, in which mobile device 106*c* currently has cell 102*f* as its serving cell. If, for the sake of illustration, it is further assumed that mobile device 106*c* has determined that it is in a limited mobility or single cell environment in accordance with block 601, and mobile device 106*c* loses service coverage from cell 102*f*, then in some embodiments mobile device 106*c* will limit uplink transmission for user data at the data service level in accordance with blocks 604 and 608.

In block 606, the mobile device checks if the cell receive quality of the serving cell has dropped below a predetermined threshold for a predetermined period of time. If the cell receive quality of the serving cell has not been below the predetermined threshold for at least the predetermined period of time, the method returns to block 602 (No path) to continue monitoring cell receive quality. Otherwise, if the cell receive quality of the serving cell has been below the predetermined threshold for at least the predetermined period of time, the method proceed to block 608 (Yes path), in which the mobile device limits uplink transmission for user data at the data service level. For example, referring again to FIG. 1, if the cell receive quality of serving cell 102*f* at mobile device 106*c* drops below a predetermined threshold for more than a predetermined amount of time, in some embodiments mobile device 106*c* will limit uplink transmission for user data in accordance with blocks 606 and 608.

In some embodiments, after having previously limited uplink transmission for user data in block 608, the method proceeds to block 610, in which the mobile device checks whether it has returned to service coverage on a different cell. If the mobile device determines that it has returned to service coverage on a different cell than that on which it lost service coverage, then the method proceeds to block 614 (Yes path), in which the mobile device permits uplink transmission for user data, and the method returns to block 601 to continue monitoring for a low mobility or single cell environment. Otherwise, if the mobile device has not returned to service coverage on a different cell, then the method proceeds to block 612 (No path), in which the mobile device checks whether the cell receive quality of the serving cell has been above the predetermined threshold for a predetermined period of time. If the cell receive quality of the serving cell has been above the predetermined threshold for a predetermined period of time, then the method proceeds to block 614 (Yes path), in which the mobile device permits uplink transmission for user data and the method returns to block 601 to continue monitoring for a low mobility or single cell environment. Otherwise, if the cell receive quality of the serving cell has not been above the predetermined threshold for a predetermined period of time, then the method proceeds to block 616 (No path).

To illustrate the operation of blocks 610 and 612 by way of example, reference is made again to FIG. 1. In some embodiments, if mobile device 106*c* has begun limiting uplink transmission for user data due to loss of service coverage on cell 102*f* and subsequently returns to service coverage on a different cell, such as one of neighbor cells 102*a*, 102*e* or 102*g*, mobile device 106*c* may re-enable uplink transmission for user data, in accordance with blocks 610 and 614 of FIG. 6. Similarly, in some embodiments, if mobile device 106*c* has begun limiting uplink transmission for user data due to cell 102*f* having poor cell receive quality, but the cell receive quality of cell 102*f* improves and remains above a threshold for at least a predetermined amount of time, then mobile device 106 may re-enable uplink transmission for user data, in accordance with blocks 612 and 614 of FIG. 6.

In block 616, the mobile device checks whether user interaction with the mobile device has been detected. Detecting user interaction may include checking whether a screen of the mobile device is turned on and active and/or checking whether the mobile device is currently tethered to an access point. If user interaction is not detected, the method returns to block 602 (No path) to continue monitoring cell receive quality. Otherwise, if user interaction is detected, which may indicate that requests for uplink transmission for user data originate from user-generated requests rather than from background applications, then the method proceeds to block 614 (Yes path) and uplink transmission for user data is permitted before returning to block 601 to continue monitoring for a low mobility or single cell environment.

The method illustrated in the flowchart of FIG. 6 is merely exemplary. The steps of the method may be re-ordered and/or steps may be added or removed. For example, in some embodiments, the flowchart may include a check for user interaction between blocks 606 and 608, such that the mobile device checks for user interaction with the mobile device following the yes path from block 606, and if user interaction is detected the method returns to block 601 and the mobile device continues to monitor for a low mobility or single cell environment. Otherwise, if user interaction is not detected following block 606, the method proceeds to block 608 and uplink transmission for user data is limited.

In some embodiments, monitoring cell receive quality in block 602 includes monitoring cell receive quality of the serving cell and any neighbor cell(s) and the check performed in block 612 includes checking if the cell receive quality for any of the cells visible to the mobile device, including the serving cell and any neighbor cell(s), has been above the predetermined threshold for the predetermined period of time, such that the method proceeds to block 614 if the cell receive quality for the serving cell and/or at least one of the neighboring cell(s) has been above the predetermined threshold for the predetermined period of time.

The method implemented by the flowchart shown in FIG. 6 uses cell receive quality to determine when to permit or limit uplink transmission for user data. Other embodiments utilize the results of previous transmission/reception attempts to do the same, as discussed below.

By using statistical analysis of the results of previous transmission/reception attempts, it may be possible to determine the likelihood that data will be successfully sent. In many cases, it may not be easily possible to use directly correlated information on user data, but the temporal data for non-user data device transmissions can potentially be used. Temporal data including an Acknowledgement/Negative Acknowledgement (ACK/NACK) rate of various control channels, Packet Data Units (PDUs), and control messages (including usage or retry timers) could potentially be used as part of an algorithm to predict if it is worth it to attempt uplink transmissions. By setting up thresholds based on the analyses of these temporal data points, it may be possible to limit or choke off uplink transmissions when conditions are unfavorable to save the device power that might otherwise be consumed transmitting or retransmitting user data. Once the device returns to "good" conditions, or if detectable user interaction is being applied (e.g. screen is on and being used and/or the device is tethered to an access point) the device could be configured to again permit uplink transmission for user data.

Examples of methods of limiting uplink transmission for user data based on the foregoing concepts will now be described with reference to FIGS. 7 and 8.

Figure 7:
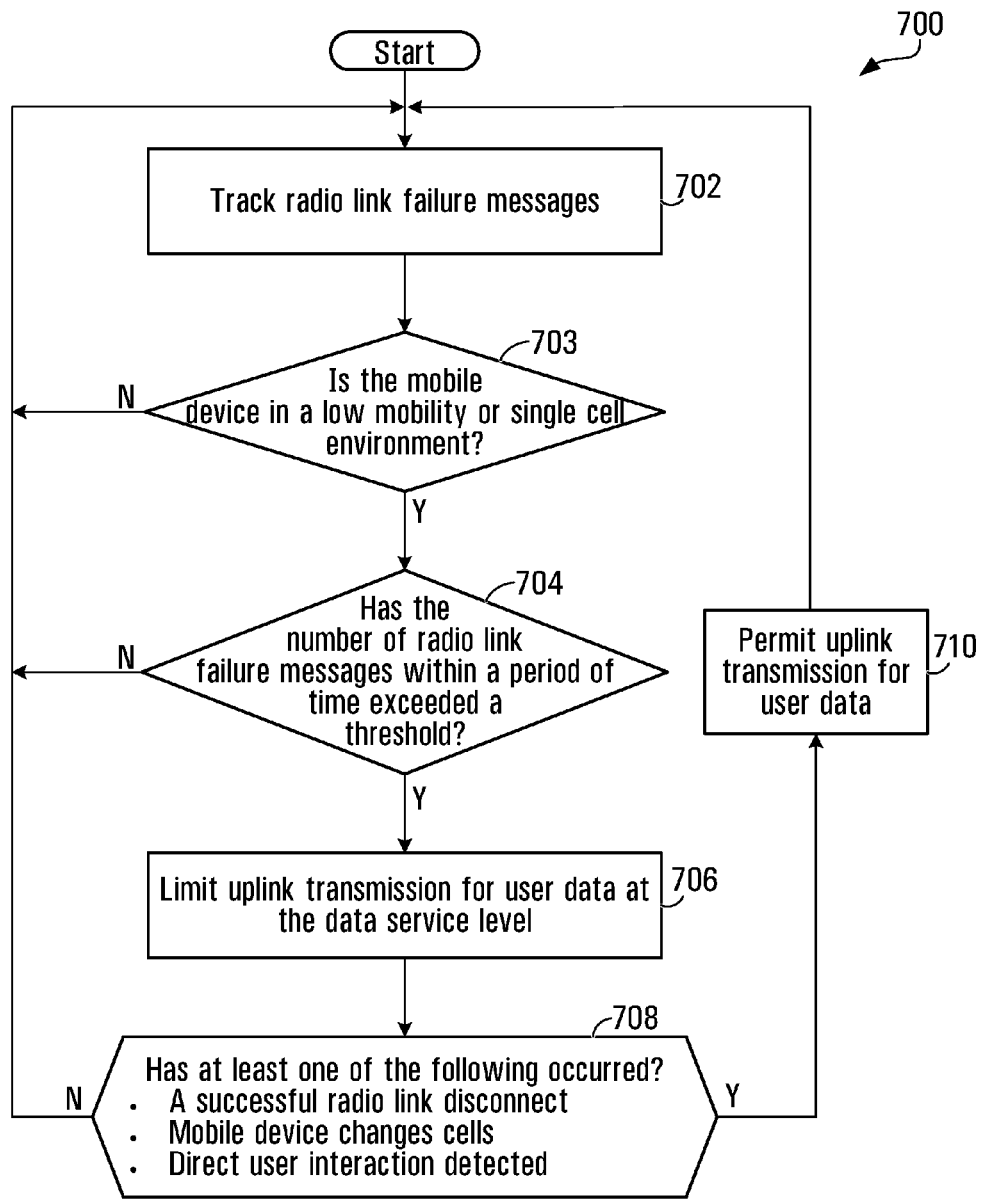
FIG. 7 is a flowchart of a first example of a method of limiting uplink transmission for user data at the data service level based at least in part on results of past uplink transmission.

FIG. 7 is a flow chart of a method 700 of limiting uplink transmission for user data at the data service level based at least in part on results of past uplink transmission. In particular, the method 700 implemented by the flowchart shown in FIG. 7 tracks radio link failure messages and limits uplink transmission for user data at the data service level based at least in part on whether the number of radio link failure messages within a period of time exceeds a threshold.

The method 700 begins at block 702, in which the mobile device tracks radio link failure messages and the method proceeds to block 703. A radio link failure message may be generated when a radio link fails; for example, when an attempt to establish a radio link fails and/or when an established radio link fails. In general, a radio link failure message is sent when a requested control signaling connection between the mobile device and the network cannot be maintained.

In block 703, the mobile device determines if it is currently in a low mobility or single cell environment. If so, the method proceeds to block 704 (Yes path). If not, method returns to block 702 (No path) and the mobile device continues to track radio link failure messages.

In block 704, the mobile device checks if the number of radio link failure messages within a period of time has exceeded a predetermined threshold. If the mobile device determines in block 704 that the number of radio link failure messages received with a period of time has exceeded the threshold, then the method proceeds to block 706 (Yes path). Otherwise, the method returns to block 702 (No path) and the mobile device continues to track radio link failure messages.

In block 706, the mobile device limits uplink transmission for user data at the data service level.

In some embodiments, after having previously limited uplink transmission for user data in block 706, the method proceeds to block 708, in which the mobile device checks for a successful radio link disconnect, a hand-off of the mobile device and/or direct user interaction. If any of the foregoing occurs, the method proceeds to block 710 (Yes path) and the mobile device permits uplink transmission for user data. Otherwise, the method returns to block 702 (No path) to continue tracking radio link failure messages. A successful radio link disconnect is sent when either the network or the mobile device decides to end a communication session and both sides properly terminate the communication channel. In some cases, it is desirable to re-enable uplink transmission following a successful radio link disconnect because the previous communication was successfully setup, transmitted and terminated, which may indicate that future communication may be worth attempting.

The method illustrated in the flowchart of FIG. 7 is merely exemplary. The steps of the method may be re-ordered and/or steps may be added or removed. For example, in some embodiments, the flowchart may include a check for user interaction between blocks 704 and 706, such that the mobile device checks for user interaction with the mobile device following the yes path from block 704, and if user interaction is detected the method returns to block 702 and the mobile device continues to track radio link failure messages. Otherwise, if user interaction is not detected following block 704, the method proceeds to block 706 and uplink transmission for user data is limited.

Figure 8:
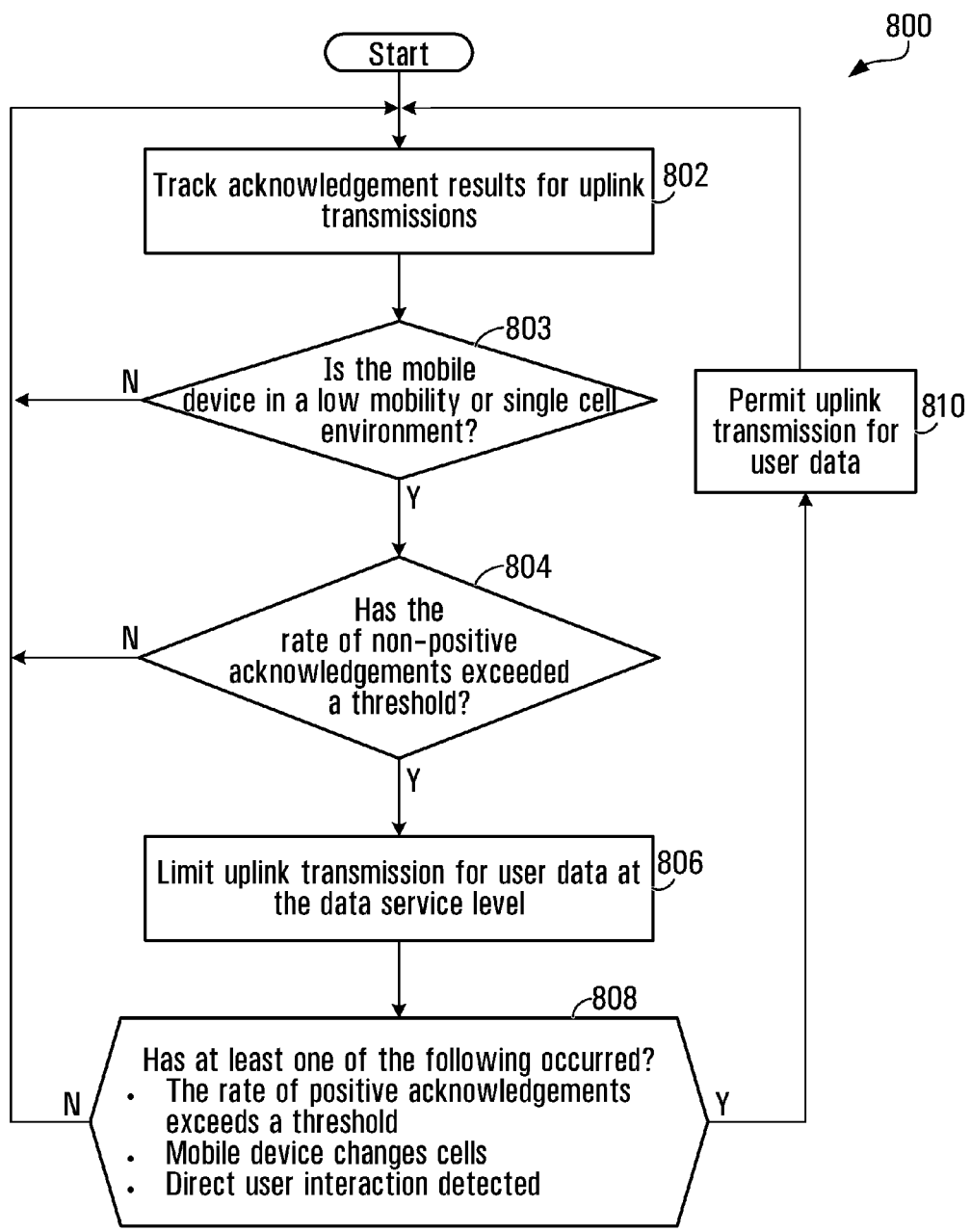
FIG. 8 is a flowchart of a second example of a method of limiting uplink transmission for user data at the data service level based at least in part on results of past uplink transmission.

FIG. 8 is a flow chart of a method 800 of limiting uplink transmission for user data at the data service level based at least in part on results of past uplink transmission. In particular, the method 800 implemented by the flowchart shown in FIG. 8 tracks acknowledgement results for uplink transmission and limits uplink transmission for user data at the data service level based at least in part on whether the rate of non-positive acknowledgements within a period of time exceeds a threshold.

The method 800 begins at block 802, in which the mobile device tracks acknowledgement results for uplink transmissions and the method proceeds to block 803. Acknowledgement results may include positive acknowledgements, negative acknowledgements and/or non-acknowledgements. In some cases, acknowledgement results may be based on acknowledgement messages generated as part of a hybrid automatic repeat request (HARQ) mechanism.

In block 803, the mobile device determines if it is currently in a low mobility or single cell environment. If so, the method proceeds to block 804 (Yes path). If not, method returns to block 802 (No path) and the mobile device continues to track acknowledgement results.

In block 804, the mobile device checks if the rate of non-positive acknowledgements within a period of time and/or over a number of previous uplink transmission attempts has exceeded a predetermined threshold. If the mobile device determines in block 804 that the number of non-positive acknowledgements has exceeded the threshold, then the method proceeds to block 806 (Yes path). Otherwise, the method returns to block 802 (No path) and the mobile device continues to track acknowledgement results. For example, in some embodiments, if the mobile device determines in block 804 that a majority of the uplink transmission attempts are failing with no acknowledgement and/or a negative acknowledgement over the previous twenty or more previous uplink transmission attempts, then the mobile device may proceed to block 806 and limit uplink transmission for user data. However, this threshold is merely one example of a potential threshold that may be used in some embodiments and should not be considered limiting. In some embodiments, the threshold may be higher or lower than that of the specific example.

In block 806, the mobile device limits uplink transmission for user data at the data service level.

In some embodiments, after having previously limited uplink transmission for user data in block 806, the method proceeds to block 808, in which the mobile device checks for the rate of positive acknowledgements to exceed a threshold, a hand-off of the mobile device and/or direct user interaction. If any of the foregoing occurs, the method proceeds to block 810 (Yes path) and the mobile device permits uplink transmission for user data. Otherwise, the method returns to block 802 (No path) to continue tracking acknowledgement results. For example, if the mobile device determines in block 808 that a majority of uplink transmission attempts have been successful with positive acknowledgements over the previous twenty or more previous transmission attempts, then the mobile device may proceed to block 810 and re-enable uplink transmission for user data.

The method illustrated in the flowchart of FIG. 8 is merely exemplary. The steps of the method may be re-ordered and/or steps may be added or removed. For example, in some embodiments, the flowchart may include a check for user interaction between blocks 804 and 806, such that the mobile device checks for user interaction with the mobile device following the yes path from block 804, and if user interaction is detected the method returns to block 802 and the mobile device continues to track acknowledgement results for uplink transmissions. Otherwise, if user interaction is not detected following block 804, the method proceeds to block 806 and uplink transmission for user data is limited.

In some embodiments, tracking acknowledgement results for past uplink transmissions in block 802 comprises tracking acknowledgement results for at least one of: a) uplink access attempts made by the mobile device on an uplink random access channel (RACH) in idle mode; and b) uplink transmission of packet data units (PDUs) made by the mobile device in connected mode.

Figure 9:
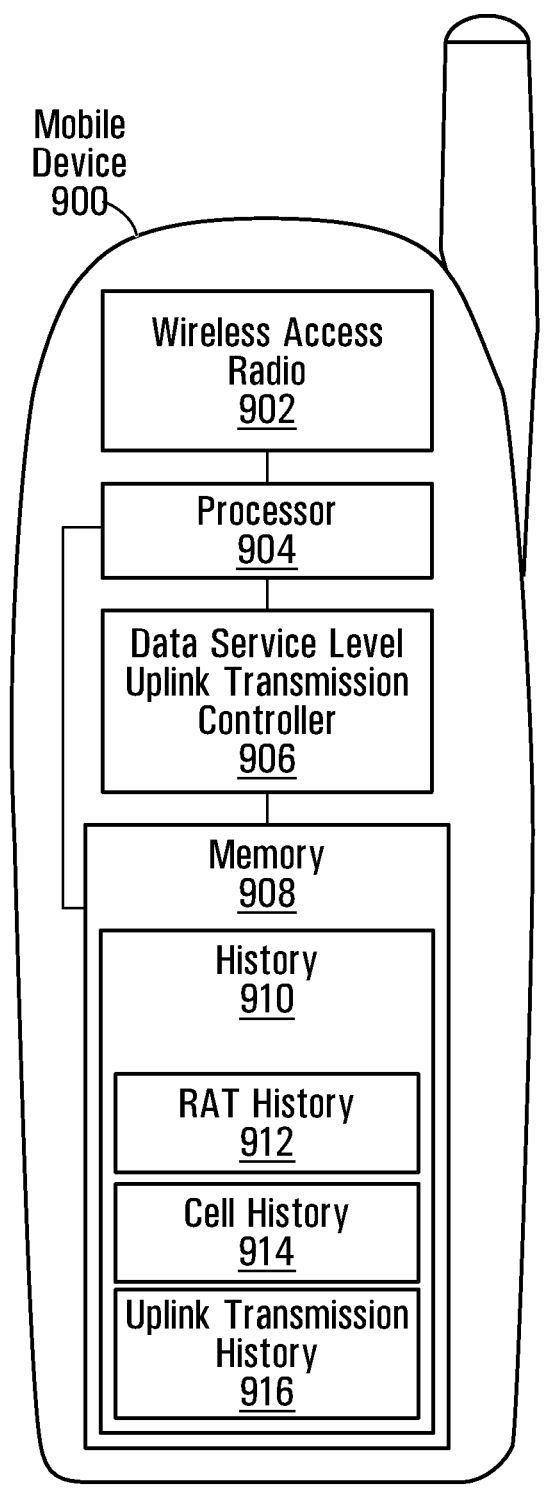
FIG. 9 is a block diagram of an example of a mobile device.

Example details of a mobile device 900 in accordance with an embodiment of the present disclosure are shown in FIG. 9. Mobile device 900 has a wireless access radio 902, a processor 904, and a data service level uplink transmission controller 906. The mobile device 900 may have other components, but they are not shown for the sake of simplicity.

Wireless access radio 902 is functionally connected to processor 904. Processor 904 is also functionally connected to data service level uplink transmission controller 906.

Wireless access radio 902 is configured to transmit and receive wireless signalling from at least one wireless network, via at least one wireless radio access technology (RAT). Processor 904 is configured to, amongst other things, process data associated with wireless communication via wireless access radio 902 and communicate with data service level uplink transmission controller 906. Although data service level uplink transmission controller 906 is shown as being separate from the processor 904, in some embodiments the data service level uplink transmission controller may be implemented, at least in part, by processor 904.

Data service level uplink transmission controller 906 is configured to monitor at least one characteristic related to uplink transmission and limit uplink transmission for user data at the data service level based at least in part on the at least one characteristic.

In some embodiments, data service level uplink transmission controller 906 is further configured to determine whether uplink transmission is unlikely to be successful based at least in part on the at least one characteristic and limit uplink transmission for user data at the data service level responsive to determining that uplink transmission is unlikely to be successful.

In some embodiments, data service level uplink transmission controller 906 is further configured to permit uplink transmission for user data responsive to determining that uplink transmission is no longer unlikely to be successful based at least in part on the at least one characteristic.

In some embodiments, data service level uplink transmission controller 906 is configured to inhibit non-emergency uplink transmission for user data at the data service level while permitting network-required uplink transmissions and emergency uplink transmissions.

In some embodiments, data service level uplink transmission controller 906 is configured to shut off all uplink transmissions for user data at the data service level.

In some embodiments, data service level uplink transmission controller 906 is configured to permit uplink transmission for user data responsive to detecting user interaction with the mobile device. For example, in some cases wireless access radio 902 is configured to allow mobile device 902 to be tethered to an access point, such as a Wi-Fi hotspot and data service level uplink transmission controller 906 is configured to permit uplink transmission for wireless data if it detects that mobile device 902 has been tethered to an access point. Similarly, in some cases mobile device 900 includes at least one user input/output device (not shown in FIG. 9), such as a touchscreen or other visual display, an audio input device and/or an audio output device, and data service level uplink transmission controller 906 is configured to permit uplink transmission for wireless data if it detects use of at least one of the user input/output device(s).

In some embodiments, mobile device 900 further includes a memory. In the illustrative embodiment shown in FIG. 9, a memory 908 is functionally connected to the processor 904 and the data service level uplink transmission controller 906. In some embodiments, the processor 904 and the data service level uplink transmission controller are configured to store and receive data in/from memory 908.

In some embodiments, memory 908 may be used to store a history 910 that includes information that may be used by the data service level uplink transmission controller 906 to determine when to limit uplink transmission for user data. For example, in some embodiments, history 910 may include a RAT history 912, a cell history 914 and/or an uplink transmission history 916.

In some embodiments, data service level uplink transmission controller 906 is configured to monitor at least one of the following characteristics related to uplink transmission: switches between radio access technologies (RATs); a transmission power level for uplink transmission; a modulation scheme used for uplink transmission; a cell receive quality; and a result of past uplink transmissions. For example, in some embodiments data service level uplink transmission controller 906 may be configured to implement one or more of the methods illustrated in the flowcharts shown in FIGS. 3 to 8. Further detailed examples of the operation of mobile device 900 based on the monitoring of each of the foregoing characteristics will now be discussed with reference to FIG. 9 and each of FIGS. 3 to 8.

In some embodiments, data service level uplink transmission controller 906 is configured to limit uplink transmission for user data at the data service level based at least in part on switches between RATs in accordance with the method 300 shown in FIG. 3. In particular, in some embodiments, data service level uplink transmission controller 906 may monitor RATs used by the mobile device, for example by monitoring RAT history 912, to determine the number of times mobile device 900 has switched from a higher order RAT to a lower order RAT within a period of time, and limit uplink transmission for user data at the data service level based at least in part on whether the mobile device has switched from a higher order RAT to a lower order RAT more than a predetermined number of times within a period of time.

In some embodiments, data service level uplink transmission controller is configured to not count a switch between a previous RAT and a new RAT toward the number of times the mobile device has switched between a higher order RAT and a lower order RAT if the mobile device has not been recently active on the new RAT.

In some embodiments, data service level uplink transmission controller 906 is configured to limit uplink transmission for user data at the data service level based at least in part on a transmission power level for uplink transmission in accordance with the methods 400 and 500 shown in FIGS. 4 and 5.

With reference to FIG. 4, in some embodiments, data service level uplink transmission controller 906 may track uplink power requests received by mobile device 900 and corresponding uplink transmission acknowledgements, for example by monitoring uplink transmission history 916, to determine whether a positive acknowledgement has not been received for a predetermined number of uplink transmissions made at the maximum transmission power of the mobile device, and limit uplink transmission for user data at the data service level based at least in part on that determination.

In some embodiments, data service level uplink transmission controller 906 is configured to permit uplink transmission for user data if a positive acknowledgement for an uplink transmission is received, mobile device 900 changes cells, and/or direct user interaction is detected.

With reference to FIG. 5, in some embodiments, data service level uplink transmission controller 906 may track uplink power requests received by mobile device 900 and a corresponding uplink transmission modulation scheme, for example by monitoring uplink transmission history 916, to determine whether the requested uplink transmission power for the lowest uplink transmission modulation scheme is above a predetermined threshold for a predetermined period of time, and limit uplink transmission for user data at the data service level based at least in part on that determination.

In some embodiments, data service level uplink transmission controller 906 is further configured to determine if mobile device 900 is in any one of a low mobility environment and single cell coverage, for example by monitoring cell history 914, and permit uplink transmission for user data if the mobile device is not in a low mobility environment or in single cell coverage.

In some embodiments, data service level uplink transmission controller 906 is further configured to permit uplink transmission for user data if mobile device 900 receives a request for an uplink transmission power below the predetermined threshold, the uplink transmission modulation scheme is increased, direct user interaction is detected, and/or a second predetermined amount of time elapses.

In some embodiments, data service level uplink transmission controller 906 is configured to limit uplink transmission for user data at the data service level based at least in part on cell receive quality in accordance with the method 600 shown in FIG. 6. In particular, in some embodiments, data service level uplink transmission controller 906 may monitor cell quality of a serving cell and any neighbor cells visible to mobile device 900, for example by monitoring cell history 914, and limit uplink transmission for user data at the data service level if the cell receive quality of the serving cell is below a predetermined threshold for a predetermined period of time, and/or the mobile device loses service coverage.

In some embodiments, data service level uplink transmission controller 906 is further configured to permit uplink transmission for user data if the cell receive quality of the serving cell rises above the predetermined threshold for a predetermined period of time.

In some embodiments, data service level uplink transmission controller 906 is configured to continue to limit uplink transmission for user data at the data service level if mobile device 900 returns to service coverage on the same serving cell on which it previously lost service coverage. However, in some embodiments, data service level uplink transmission controller 906 is configured to permit uplink transmission for user data if mobile device 900 returns to service coverage on a different cell.

In some embodiments, data service level uplink transmission controller 906 is configured to permit uplink transmission for user data if the cell receive quality of at least one neighbor cell is above the predetermined threshold for a predetermined period of time.

In some embodiments, data service level uplink transmission controller 906 is configured to limit uplink transmission for user data at the data service level based at least in part on the results of past uplink transmissions in accordance with the methods 700 and 800 shown in FIGS. 7 and 8.

With reference to FIG. 7, in some embodiments, data service level uplink transmission controller 906 may track radio link failure messages, for example by monitoring uplink transmission history 916, to determine whether the number of radio link failure messages within a period of time exceeds a threshold, and limit uplink transmission for user data at the data service level based at least in part on that determination.

In some embodiments, data service level uplink transmission controller 906 is further configured to permit uplink transmission for user data if a successful radio link disconnect occurs, mobile device 900 changes cells, and/or direct user interaction is detected.

With reference to FIG. 8, in some embodiments, data service level uplink transmission controller 906 may track acknowledgement results for past uplink transmissions, for example by monitoring uplink transmission history 916, to determine whether the rate of non-positive acknowledgements exceeds a threshold, and limit uplink transmission for user data at the data service level based at least in part on that determination.

In some embodiments, data service level uplink transmission controller 906 is further configured to permit uplink transmission for user data if the rate of positive acknowledgements exceeds a threshold, mobile device 900 changes cells, and/or direct user interaction is detected.

Figure 10:
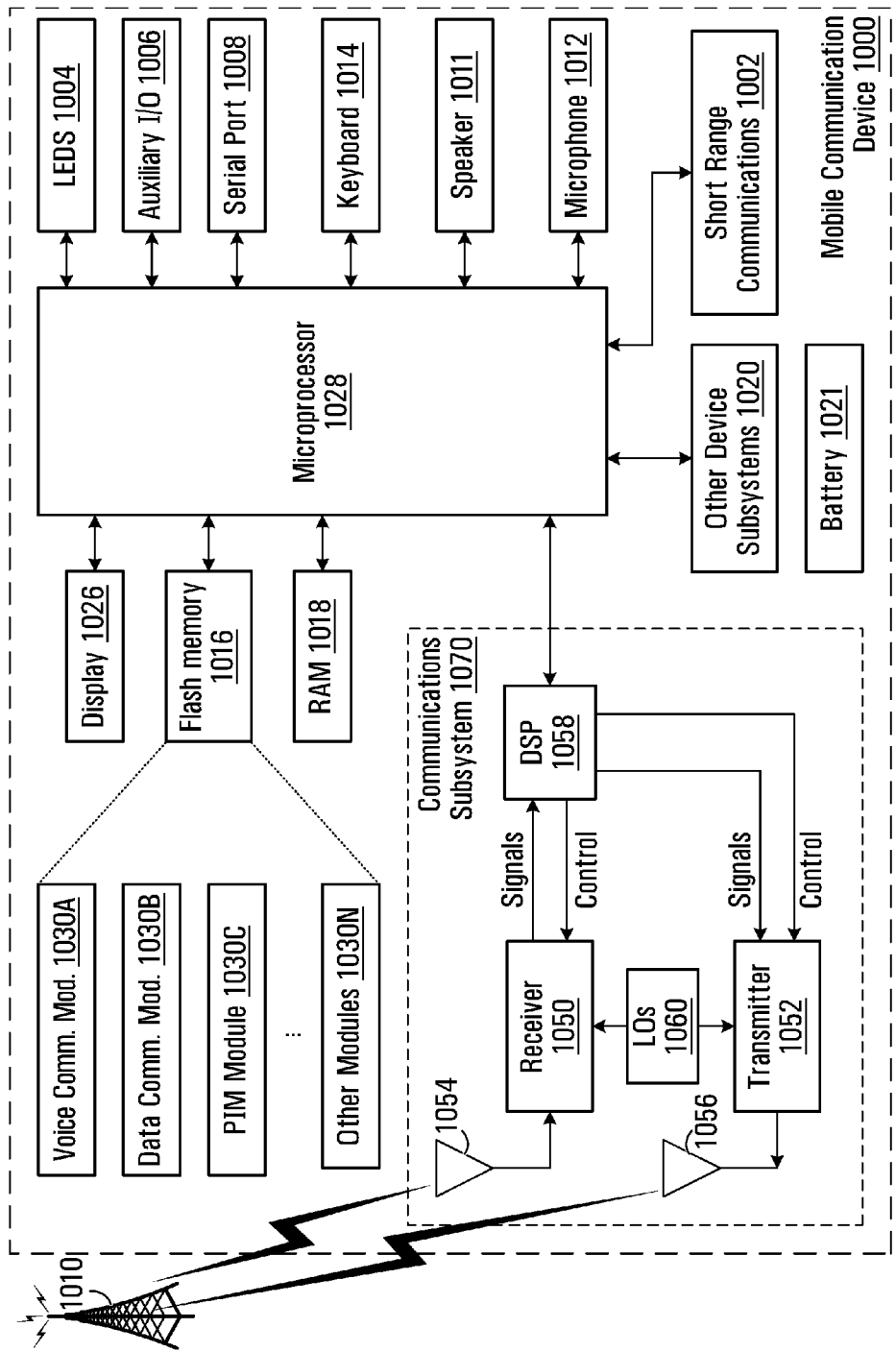
FIG. 10 is a block diagram of another mobile device.

Referring now to FIG. 10, shown is a block diagram of another mobile device 1000 that may implement any of the methods described herein. It is to be understood that the mobile device 1000 is shown with very specific details for example purposes only.

A processing device (a microprocessor 1028) is shown schematically as coupled between a keyboard 1014 and a display 1026. The microprocessor 1028 is a type of processor with features similar to those of the processor 904 of the wireless device 900 shown in FIG. 9. The microprocessor 1028 controls operation of the display 1026, as well as overall operation of the mobile device 1000, in response to actuation of keys on the keyboard 1014 by a user.

The mobile device 1000 has a housing that may be elongated vertically, or may take on other sizes and shapes (including clamshell housing structures). The keyboard 1014 may include a mode selection key, or other hardware or software for switching between text entry and telephony entry.

In addition to the microprocessor 1028, other parts of the mobile device 1000 are shown schematically. These include: a communications subsystem 1070; a short-range communications subsystem 1002; the keyboard 1014 and the display 1026, along with other input/output devices including a set of LEDS 1004, a set of auxiliary I/O devices 1006, a serial port 1008, a speaker 1011 and a microphone 1012; as well as memory devices including a flash memory 1016 and a Random Access Memory (RAM) 1018; and various other device subsystems 1020. The mobile device 1000 may have a battery 1021 to power the active elements of the mobile device 1000. The mobile device 1000 is in some embodiments a two-way radio frequency (RF) communication device having voice and data communication capabilities. In addition, the mobile device 1000 in some embodiments has the capability to communicate with other computer systems via the Internet.

Operating system software executed by the microprocessor 1028 is in some embodiments stored in a persistent store, such as the flash memory 1016, but may be stored in other types of memory devices, such as a read only memory (ROM) or similar storage element. In addition, system software, specific device applications, or parts thereof, may be temporarily loaded into a volatile store, such as the RAM 1018. Communication signals received by the mobile device 1000 may also be stored to the RAM 1018.

The microprocessor 1028, in addition to its operating system functions, enables execution of software applications on the mobile device 1000. A predetermined set of software applications that control basic device operations, such as a voice communications module 1030A and a data communications module 1030B, may be installed on the mobile device 1000 during manufacture. In addition, a personal information manager (PIM) application module 1030C may also be installed on the mobile device 1000 during manufacture. The PIM application is in some embodiments capable of organizing and managing data items, such as e-mail, calendar events, voice mails, appointments, and task items. The PIM application is also in some embodiments capable of sending and receiving data items via a wireless network 1010. In some embodiments, the data items managed by the PIM application are seamlessly integrated, synchronized and updated via the wireless network 1010 with the device user's corresponding data items stored or associated with a host computer system. As well, additional software modules, illustrated as another software module 1030N, may be installed during manufacture.

The flash memory 1016 stores computer executable instructions for implementing features similar to those of the data service level uplink transmission controller 906 of the mobile device 900 shown in FIG. 9. The flash memory 1016 may also store a history similar to that stored in memory 908 shown in FIG. 9. In some embodiments, the history stored in the flash memory 1016 includes one or more of a RAT history, a cell history and an uplink transmission history similar to those shown in FIG. 9. In some embodiments, the history may not need to persist and therefore may be stored in RAM 1018 rather than in flash memory 1016. Note that the implementations described with reference to FIG. 10 are very specific for exemplary purposes.

Communication functions, including data and voice communications, are performed through the communication subsystem 1070, and possibly through the short-range communications subsystem 1070. The communication subsystem 1070 includes a receiver 1050, a transmitter 1052 and one or more antennas, illustrated as a receive antenna 1054 and a transmit antenna 1056. In addition, the communication subsystem 1070 also includes a processing module, such as a digital signal processor (DSP) 1058, and local oscillators (LOs) 1060. The communication subsystem 1070 is an implementation of a wireless access radio with features similar to those of the wireless access radio 902 of the wireless device 900 shown in FIG. 9. In some embodiments, the communication subsystem 1070 includes a separate antenna arrangement (similar to the antennas 1054 and 1056) and RF processing chip/block (similar to the Receiver 1050, LOs 1060 and Transmitter 1052) for each RAT, although a common baseband signal processor (similar to DSP 1058) may be used for baseband processing for multiple RATs. The specific design and implementation of the communication subsystem 1070 is dependent upon the communication network in which the mobile device 1000 is intended to operate. For example, the communication subsystem 1070 of the mobile device 1000 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 1000.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 1000 may send and receive communication signals over the communication network 1010. Signals received from the communication network 1010 by the receive antenna 1054 are routed to the receiver 1050, which provides for signal amplification, frequency down conversion, filtering, channel selection, etc., and may also provide analog to digital conversion. Analog-to-digital conversion of the received signal allows the DSP 1058 to perform more complex communication functions, such as demodulation and decoding. In a similar manner, signals to be transmitted to the network 1010 are processed (e.g., modulated and encoded) by the DSP 1058 and are then provided to the transmitter 1052 for digital to analog conversion, frequency up conversion, filtering, amplification and transmission to the communication network 1010 (or networks) via the transmit antenna 1056.

In addition to processing communication signals, the DSP 1058 provides for control of the receiver 1050 and the transmitter 1052. For example, gains applied to communication signals in the receiver 1050 and the transmitter 1052 may be adaptively controlled through automatic gain control algorithms implemented in the DSP 1058.

In a data communication mode, a received signal, such as a text message or web page download, is processed by the communication subsystem 1070 and is input to the microprocessor 1028. The received signal is then further processed by the microprocessor 1028 for an output to the display 1026, or alternatively to some other auxiliary I/O devices 1006. A device user may also compose data items, such as e-mail messages, using the keyboard 1014 and/or some other auxiliary I/O device 1006, such as a touchpad, a rocker switch, a thumb-wheel, or some other type of input device. The composed data items may then be transmitted over the communication network 1010 via the communication subsystem 1070.

In a voice communication mode, overall operation of the device is substantially similar to the data communication mode, except that received signals are output to a speaker 1011, and signals for transmission are generated by a microphone 1012. Alternative voice or audio I/O subsystems, such as a voice message recording subsystem, may also be implemented on the mobile device 1000. In addition, the display 1026 may also be utilized in voice communication mode, for example, to display the identity of a calling party, the duration of a voice call, or other voice call related information.

The short-range communications subsystem 1002 enables communication between the mobile device 1000 and other proximate systems or devices, which need not necessarily be similar devices. For example, the short-range communications subsystem may include an infrared device and associated circuits and components, or a Bluetooth™ communication module to provide for communication with similarly-enabled systems and devices.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the application may be practised otherwise than as specifically described herein. Further, it is intended to be understood that the following clauses further describe aspects of the present disclosure.

1. A method in a mobile device, the method comprising:
monitoring at least one characteristic related to uplink transmission; and
limiting uplink transmission for user data at the data service level based at least in part on the at least one characteristic.

2. The method of clause 1, further comprising:
determining whether uplink transmission is unlikely to be successful based at least in part on the at least one characteristic; and
wherein the limiting uplink transmission for user data at the data service level is responsive to determining that uplink transmission is unlikely to be successful.

3. The method of clause 2, further comprising:
permitting uplink transmission for user data responsive to determining that uplink transmission is no longer unlikely to be successful based at least in part on the at least one characteristic.

4. The method of any one of clauses 1 to 3, wherein limiting uplink transmission for user data at the data service level comprises inhibiting non-emergency uplink transmission for user data at the data service level while permitting network-required uplink transmissions and emergency uplink transmissions.

5. The method of clause 4, wherein inhibiting uplink transmission for user data at the data service level comprises shutting off all non-emergency uplink transmissions for user data at the data service level.

6. The method of any one of clauses 1 to 5, wherein limiting uplink transmission for user data at the data service level comprises:
permitting uplink transmission for user data responsive to detecting user interaction with the mobile device; and
inhibiting uplink transmission for user data in the absence of detecting user interaction with the mobile device.

7. The method of clause 6, wherein detecting user interaction with the mobile device comprises at least one of:
detecting use of at least one user input/output device of the mobile device; and
detecting tethering of the mobile device.

8. The method of clause 7, wherein the user input/output device comprises at least one of:
a touchscreen;
an audio input device; and
an audio output device.

9. The method of any one of clauses 1 to 8, wherein monitoring at least one characteristic related to uplink transmission comprises monitoring at least one of:
switches between radio access technologies (RATs);
a transmission power level for uplink transmission;
a modulation scheme used for uplink transmission;
a cell receive quality; and
a result of past uplink transmissions.

10. The method of any one of clauses 1 to 9, wherein limiting uplink transmission for user data at the data service level based at least in part on the at least one characteristic comprises:
limiting uplink transmission for user data at the data service level based at least in part on switches between radio access technologies (RATs).

11. The method of clause 10, wherein limiting uplink transmission for user data at the data service level based at least in part on switches between radio access technologies (RATs) comprises determining the number of times the mobile device has switched RATs within a period of time.

12. The method of clause 11, wherein determining the number of times the mobile device has switched RATs within a period of time comprises determining the number of times the mobile device has switched from a higher order RAT to a lower order RAT within a period of time.

13. The method of clause 12, further comprising:
monitoring for a switch between RATs;
responsive to identifying a switch between a previous RAT and a new RAT, determining if the new RAT is of a lower order than the previous RAT; and
responsive to determining that the new RAT is of a lower order than the previous RAT, determining whether the number of times the mobile device has switched from a higher order RAT to a lower order RAT has occurred more than a predetermined number of times within a period of time.

14. The method of clause 13, wherein limiting uplink transmission for user data at the data service level based at least in part on switches between RATs comprises:
limiting uplink transmission for user data at the data service level based at least in part on whether the mobile device has switched from a higher order RAT to a lower order RAT more than a predetermined number of times within a period of time.

15. The method of clause 13 or 14, wherein a switch between a previous RAT and a new RAT that has not been recently active is not counted toward the number of times the mobile device has switched between a higher order RAT and a lower order RAT.

16. The method of any one of clauses 1 to 9, wherein monitoring at least one characteristic related to uplink transmission comprises:
monitoring a transmission power level for uplink transmission.

17. The method of clause 16, wherein monitoring a transmission power level for uplink transmission comprises:
tracking uplink power requests received by the mobile device and corresponding uplink transmission acknowledgements.

18. The method of clause 17, wherein tracking uplink power requests received by the mobile device and corresponding uplink transmission acknowledgements comprises tracking uplink power requests received in respect of uplink transmissions made for a random access channel (RACH) in idle mode of the mobile device.

19. The method of clause 17 or 18, wherein limiting uplink transmission for user data at the data service level based at least in part on the at least one characteristic comprises:
limiting uplink transmission for user data at the data service level based at least in part on whether a positive acknowledgement has not been received for a predetermined number of uplink transmissions made at the maximum transmission power of the mobile device.

20. The method of clause 19, further comprising:
permitting uplink transmission for user data if at least one of the following occur:

a positive acknowledgement for an uplink transmission is received;
the mobile device changes cells; and
user interaction is detected.

21. The method of clause 16, wherein monitoring a transmission power level for uplink transmission comprises:
tracking uplink power requests received by the mobile device and a corresponding uplink transmission modulation scheme.

22. The method of clause 21, wherein tracking uplink power requests received by the mobile device comprises tracking uplink power requests received in respect of uplink transmissions made for a dedicated data channel (DCH).

23. The method of clause 21 or 22, wherein limiting uplink transmission for user data at the data service level based at least in part on the at least one characteristic comprises:
limiting uplink transmission for user data at the data service level based at least in part on whether the requested uplink transmission power for the lowest uplink transmission modulation scheme is above a predetermined threshold for a predetermined period of time.

24. The method of clause 23, further comprising:
determining if the mobile device is in any one of a low mobility environment and single cell coverage, wherein limiting uplink transmission for user data at the data service level is further based at least in part on whether the mobile device is in any one of a low mobility environment and single cell coverage.

25. The method of any one of clauses 21 to 24, further comprising:
permitting uplink transmission for user data if at least one of the following occur:
a request for an uplink transmission power below the predetermined threshold is received;
the uplink transmission modulation scheme is increased;
user interaction is detected; and
a second predetermined amount of time elapses.

26. The method of any one of clauses 1 to 9, wherein:
monitoring at least one characteristic related to uplink transmission comprises monitoring cell receive quality of a serving cell; and
limiting uplink transmission for user data at the data service level comprises limiting uplink transmission for user data at the data service level if at least one of the following occurs:
the cell receive quality of the serving cell is below a predetermined threshold for a predetermined period of time; and
the mobile device loses service coverage.

27. The method of clause 26, further comprising:
permitting uplink transmission for user data if the cell receive quality of the serving cell rises above the predetermined threshold for a predetermined period of time.

28. The method of clause 26 or 27, further comprising:
after previously limiting uplink transmission for user data due to loss of service coverage from a serving cell, continuing to limit uplink transmission for user data at the data service level if the mobile device returns to service coverage on the same serving cell.

29. The method of clause 28, further comprising:
permitting uplink transmission for user data if the mobile device returns to service coverage on a different cell.

30. The method of any one of clauses 26 to 29, wherein:
monitoring at least one characteristic related to uplink transmission further comprises monitoring cell receive quality of at least one neighbor cell; and
permitting uplink transmission for user data if the cell receive quality of at least one of the serving cell and the at least one neighbor cell is above the predetermined threshold for a predetermined period of time.

31. The method of any one of clauses 26 to 30, further comprising:
determining if the mobile device is in any one of a low mobility environment and single cell coverage, wherein limiting uplink transmission for user data at the data service level is further based at least in part on whether the mobile device is in any one of a low mobility environment and single cell coverage.

32. The method of any one of clauses 26 to 31, wherein uplink transmission for user data is permitted if user interaction is detected.

33. The method of any one of clauses 1 to 9, wherein:
monitoring at least one characteristic related to uplink transmission comprises monitoring results of past uplink transmissions; and
limiting uplink transmission for user data at the data service level based at least in part on the at least one characteristic comprises limiting uplink transmission for user data at the data service level based at least in part on the results of past uplink transmissions.

34. The method of clause 33, wherein:
monitoring results of past uplink transmissions comprises tracking radio link failure messages; and
limiting uplink transmission for user data at the data service level based at least in part on the results of past uplink transmissions comprises limiting uplink transmission for user data at the data service level based at least in part on whether the number of radio link failure messages within a period of time exceeds a threshold.

35. The method of clause 34, further comprising:
permitting uplink transmission for user data if at least one of the following occur:
a successful radio link disconnect;
the mobile device changes cells; and
user interaction is detected.

36. The method of clause 34 or 35, further comprising:
determining if the mobile device is in any one of a low mobility environment and single cell coverage, wherein limiting uplink transmission for user data at the data service level based at least in part on the results of past uplink transmissions is further based at least in part on whether the mobile device is in any one of a low mobility environment and single cell coverage.

37. The method of clause 33, wherein:
monitoring results of past uplink transmissions comprises tracking acknowledgement results for past uplink transmissions; and
limiting uplink transmission for user data at the data service level based at least in part on the results of past uplink transmissions comprises limiting uplink transmission for user data at the data service level based at least in part on whether the rate of non-positive acknowledgements exceeds a threshold.

38. The method of clause 37, wherein the rate of non-positive acknowledgements comprises at least one of the rate of negative acknowledgements and the rate of non-acknowledgements.

39. The method of clause 37 or 38, wherein tracking acknowledgement results for past uplink transmissions comprises tracking acknowledgement results for at least one of:
a) uplink access attempts made by the mobile device on an uplink random access channel (RACH) in idle mode; and b) uplink transmission of packet data units (PDUs) made by the mobile device in connected mode.
40. The method of any one of clauses 37 to 39, further comprising:
permitting uplink transmission for user data if at least one of the following occur:
the rate of positive acknowledgements exceeds a threshold;
the mobile device changes cells; and
user interaction is detected.
41. The method of any one of clauses 37 to 40, further comprising:
determining if the mobile device is in any one of a low mobility environment and single cell coverage, wherein limiting uplink transmission for user data at the data service level is further based at least in part on whether the mobile device is in any one of a low mobility environment and single cell coverage.
42. A mobile device comprising:
at least one antenna;
a wireless access radio, functionally connected to the at least one antenna, configured to communicate with at least one wireless access network;
a processor, functionally connected to the wireless access radio, configured to process wireless communications communicated via the wireless access radio;
a data service level uplink transmission controller configured to:
monitor at least one characteristic related to uplink transmission; and
limit uplink transmission for user data at the data service level based at least in part on the at least one characteristic.
43. The mobile of clause 42, wherein the data service level uplink transmission controller is further configured to:
determine whether uplink transmission is unlikely to be successful based at least in part on the at least one characteristic; and
limit uplink transmission for user data at the data service level responsive to determining that uplink transmission is unlikely to be successful.
44. The mobile device of clause 43, wherein the data service level uplink transmission controller is configured to permit uplink transmission for user data responsive to determining that uplink transmission is no longer unlikely to be successful based at least in part on the at least one characteristic.
45. The mobile device of any one of clauses 42 to 44, wherein the data service level uplink transmission controller is configured to limit uplink transmission for user data by inhibiting non-emergency uplink transmission for user data at the data service level while permitting network-required uplink transmissions and emergency uplink transmissions.
46. The mobile device of clause 45, wherein the data service level uplink transmission controller is configured to inhibit uplink transmission for user data at the data service level by shutting off all non-emergency uplink transmissions for user data at the data service level.
47. The mobile device of any one of clauses 42 to 46, wherein the data service level uplink transmission controller is configured to permit uplink transmission for user data responsive to detecting user interaction with the mobile device.
48. The mobile device of clause 47, wherein the data service level uplink transmission controller is configured to detect user interaction with the mobile device by detecting at least one of:
use of at least one user input/output device of the mobile device; and
tethering of the mobile device.
49. The mobile device of clause 48, wherein the mobile device further comprises at least one of the following user input/output devices:
a touchscreen;
an audio input device; and
an audio output device.
50. The mobile device of any one of clauses 42 to 49, wherein the data service level uplink transmission controller is configured to monitor at least one of the following characteristics related to uplink transmission:
switches between radio access technologies (RATs);
a transmission power level for uplink transmission;
a modulation scheme used for uplink transmission;
a cell receive quality; and
a result of past uplink transmissions.
51. The mobile device of any one of clauses 42 to 50, wherein the data service level uplink transmission controller is configured to limit uplink transmission for user data at the data service level based at least in part on switches between radio access technologies (RATs).
52. The mobile device of clause 51, wherein the data service level uplink transmission controller is further configured to determine the number of times the mobile device has switched RATs within a period of time.
53. The mobile device of clause 52, wherein the data service level uplink transmission controller is further configured to determine the number of times the mobile device has switched from a higher order RAT to a lower order RAT within a period of time.
54. The mobile device of clause 53, wherein the data service level uplink transmission controller is further configured to:
responsive to identifying a switch between a previous RAT and a new RAT, determine if the new RAT is of a lower order than the previous RAT; and
responsive to determining that the new RAT is of a lower order than the previous RAT, determine whether the number of times the mobile device has switched from a higher order RAT to a lower order RAT has occurred more than a predetermined number of times within a period of time.
55. The mobile device of clause 54, wherein the data service level uplink transmission controller is further configured to limit uplink transmission for user data at the data service level based at least in part on whether the mobile device has switched from a higher order RAT to a lower order RAT more than a predetermined number of times within a period of time.
56. The mobile device of clause 54 or 55, wherein the data service level uplink transmission controller is configured to not count a switch between a previous RAT and a new RAT that has not been recently active toward the number of times the mobile device has switched between a higher order RAT and a lower order RAT.
57. The mobile device of any one of clauses 42 to 50, wherein the data service level uplink transmission controller is configured to limit uplink transmission for user data at the data service level based at least in part on a transmission power level for uplink transmission.
58. The mobile device of clause 57, wherein the data service level uplink transmission controller is configured to track the uplink power requests received by the mobile device and corresponding uplink transmission acknowledgements.
59. The mobile device of clause 58, wherein the data service level uplink transmission controller is configured to track uplink power requests received in respect of uplink transmissions made for a random access channel (RACH) in idle mode of the mobile device.

60. The mobile device of clause 58 or 59, wherein the data service level uplink transmission controller is configured to limit uplink transmission for user data at the data service level based at least in part on whether a positive acknowledgement has not been received for a predetermined number of uplink transmissions made at the maximum transmission power of the mobile device.

61. The mobile device of clause 60, wherein the data service level uplink transmission controller is configured permit uplink transmission for user data if at least one of the following occur:
a positive acknowledgement for an uplink transmission is received;
the mobile device changes cells; and
user interaction is detected.

62. The mobile device of clause 57, wherein the data service level uplink transmission controller is configured to track uplink power requests received by the mobile device and a corresponding uplink transmission modulation scheme.

63. The mobile device of clause 62, wherein the data service level uplink transmission controller is configured to track uplink power requests received in respect of uplink transmissions made for a dedicated data channel (DCH).

64. The mobile device of clause 62 or 63, wherein the data service level uplink transmission controller is configured to limit uplink transmission for user data at the data service level based at least in part on whether the requested uplink transmission power for the lowest uplink transmission modulation scheme is above a predetermined threshold for a predetermined period of time.

65. The mobile device of clause 64, wherein the data service level uplink transmission controller is further configured to:
determine if the mobile device is in any one of a low mobility environment and single cell coverage; and
limit uplink transmission for user data at the data service level based further at least in part on whether the mobile device is in any one of a low mobility environment and single cell coverage.

66. The mobile device of any one of clauses 62 to 65, wherein the data service level uplink transmission controller is configured to permit uplink transmission for user data if at least one of the following occur:
a request for an uplink transmission power below the predetermined threshold is received;
the uplink transmission modulation scheme is increased;
user interaction is detected; and
a second predetermined amount of time elapses.

67. The mobile device of any one of clauses 42 to 50, wherein the data service level uplink transmission controller is configured to:
monitor cell receive quality of a serving cell; and
limit uplink transmission for user data at the data service level if at least one of the following occurs:
the cell receive quality of the serving cell is below a predetermined threshold for a predetermined period of time; and
the mobile device loses service coverage.

68. The mobile device of clause 67, wherein the data service level uplink transmission controller is configured to permit uplink transmission for user data if the cell receive quality of the serving cell rises above the predetermined threshold for a predetermined period of time.

69. The mobile device of clause 67 or 68, wherein the data service level uplink transmission controller is configured to continue to limit uplink transmission for user data at the data service level if the mobile device returns to service coverage on the same serving cell on which it lost service coverage.

70. The mobile device of clause 69, wherein the data service level uplink transmission controller is configured to permit uplink transmission for user data if the mobile device returns to service coverage on a different cell.

71. The mobile device of any one of clauses 67 to 70, wherein the data service level uplink transmission controller is configured to:
monitor cell receive quality of at least one neighbor cell; and
permit uplink transmission for user data if the cell receive quality of at least one of the serving cell and the at least one neighbor cell is above the predetermined threshold for a predetermined period of time.

72. The mobile device of any one of clauses 67 to 71, wherein the data service level uplink transmission controller is configured to:
determine if the mobile device is in any one of a low mobility environment and single cell coverage; and
limit uplink transmission for user data at the data service level based further at least in part on whether the mobile device is in any one of a low mobility environment and single cell coverage.

73. The mobile device of any one of clauses 67 to 72, wherein the data service level uplink transmission controller is configured to:
detect user interaction with the mobile device; and
permit uplink transmission for user data responsive to detecting user interaction.

74. The mobile device of any one of clauses 42 to 50, wherein the data service level uplink transmission controller is configured to:
monitor results of past uplink transmissions; and
limit uplink transmission for user data at the data service level based at least in part on the results of past uplink transmissions.

75. The mobile device of clause 74, wherein the data service level uplink transmission controller is configured to:
track radio link failure messages; and
limit uplink transmission for user data at the data service level based at least in part on whether the number of radio link failure messages within a period of time exceeds a threshold.

76. The mobile device of clause 75, wherein the data service level uplink transmission controller is configured to permit uplink transmission for user data if at least one of the following occur:
a successful radio link disconnect;
the mobile device changes cells; and
user interaction is detected.

77. The mobile device of clause 75 or 76, wherein the data service level uplink transmission controller is configured to:
determine if the mobile device is in any one of a low mobility environment and single cell coverage; and
limit uplink transmission for user data at the data service level based further at least in part on whether the mobile device is in any one of a low mobility environment and single cell coverage.

78. The mobile device of any one of clauses 74 to 77, wherein the data service level uplink transmission controller is configured to:
track acknowledgement results for past uplink transmissions; and limit uplink transmission for user data at the data service level based at least in part on whether the rate of non-positive acknowledgements exceeds a threshold.

79. The mobile device of clause 78, wherein the rate of non-positive acknowledgements comprises at least one of the rate of negative acknowledgements and the rate of non-acknowledgements.

80. The mobile device of clause 78 or 79, wherein the data service level uplink transmission controller is configured to track acknowledgement results for at least one of:
a) uplink access attempts made by the mobile device on an uplink random access channel (RACH) in idle mode; and
b) uplink transmission of packet data units (PDUs) made by the mobile device in connected mode.

81. The mobile device of any one of clauses 78 to 80, wherein the data service level uplink transmission controller is configured to permit uplink transmission for user data if at least one of the following occur:
the rate of positive acknowledgements exceeds a threshold;
the mobile device changes cells; and
user interaction is detected.

82. The mobile device of any one of clauses 78 to 81, wherein the data service level uplink transmission controller is configured to:
determine if the mobile device is in any one of a low mobility environment and single cell coverage; and
limit uplink transmission for user data at the data service level based further at least in part on whether the mobile device is in any one of a low mobility environment and single cell coverage.

We claim:

1. A method comprising:
monitoring by a mobile device at least one characteristic related to uplink transmission;
determining whether uplink transmission is unlikely to be successful based at least in part on the at least one characteristic;
transmitting user data on the uplink transmission responsive to determining that the transmission of user data is likely to be successful based at least in part on the at least one characteristic; and
responsive to determining that uplink transmission is unlikely to be successful based at least in part on the at least one characteristic, inhibiting non-emergency uplink transmission for user data at the data service level while permitting at least one of the following: network-required uplink transmissions; or emergency uplink transmissions.

2. The method of claim 1, further comprising:
permitting uplink transmission for user data responsive to detecting user interaction with the mobile device; and
inhibiting uplink transmission for user data in the absence of detecting user interaction with the mobile device.

3. The method comprising:
monitoring by a mobile device at least one characteristic related to uplink transmission, wherein monitoring at least one characteristic related to uplink transmission comprises at least one of the following: tracking radio link failure messages; or tracking acknowledgement results for past uplink transmissions;
determining whether uplink transmission is unlikely to be successful based at least in part on the at least one characteristic;
transmitting user data on the uplink transmission responsive to determining that the transmission of user data is likely to be successful based at least in part on the at least one characteristic; and
limiting uplink transmission responsive to determining that uplink transmission is unlikely to be successful based at least in part on the at least one characteristic,
wherein limiting uplink transmission is based on at least one of the following: whether a number of radio link failure messages within a period of time exceeds a first threshold; or whether a rate of non-positive acknowledgements exceeds a second threshold; and
permitting uplink transmission for user data if at least one of the following occurs: a successful radio link disconnect; the mobile device changes cells; user interaction is detected; or a rate of positive acknowledgements exceeds a third threshold.

4. The method of claim 3, wherein tracking acknowledgement results for past uplink transmissions comprises tracking acknowledgement results for:
uplink access attempts made by the mobile device on an uplink random access channel (RACH) in idle mode.

5. The method of claim 3, further comprising:
determining if the mobile device is in any one of a low mobility environment or single cell coverage, wherein limiting uplink transmission is further based at least in part on whether the mobile device is in any one of a low mobility environment or single cell coverage.

6. The method of claim 3, wherein tracking acknowledgement results for past uplink transmissions comprises tracking acknowledgement results for uplink transmission of packet data units (PDUs) made by the mobile device in connected mode.

7. A mobile device comprising:
at least one antenna;
a wireless access radio, functionally connected to the at least one antenna, configured to receive downlink data and transmit uplink data via the at least one antenna;
a processor functionally connected to the wireless access radio and to configured to process the received downlink data forwarded by the wireless access radio and to forward the uplink data to the wireless access radio for transmission on the uplink by the at least one antenna wherein the processor is also configured as a data link uplink transmission controller and performs the following:
monitoring at least one characteristic related to uplink transmission via the at least one antenna;
determining whether transmitting of user data on the uplink is unlikely to be successful based at least in part on the at least one characteristic;
transmitting user data on an uplink responsive to determining that the transmission of user data is likely to be successful based at least in part on the at least one characteristic; and
responsive to determining that uplink transmission is unlikely to be successful based at least in part on the at least one characteristic, inhibiting non-emergency uplink transmission for user data while permitting at least one of the following: network-required uplink transmissions; or emergency uplink transmissions.

8. The method of claim 7, wherein the data service level uplink transmission controller further performs:
permitting uplink transmission for user data responsive to detecting user interaction with the mobile device; and
inhibiting uplink transmission for user data in the absence of detecting user interaction with the mobile device.

9. A mobile device comprising:
at least one antenna;

a wireless access radio, functionally connected to the at least one antenna, configured to receive downlink data and transmit uplink data via the at least one antenna;

a processor functionally connected to the wireless access radio and to configured to process the received downlink data forwarded by the wireless access radio and to forward the uplink data to the wireless access radio for transmission on the uplink by the at least one antenna wherein the processor is also configured as a data link uplink transmission controller and performs the following:

monitoring at least one characteristic related to uplink transmission via the at least one antenna, wherein monitoring at least one characteristic related to uplink transmission comprises at least one of the following: tracking radio link failure messages; or tracking acknowledgement results for past uplink transmissions;

determining whether uplink transmission is unlikely to be successful based at least in part on the at least one characteristic;

transmitting user data on the uplink responsive to determining that the transmission of user data is likely to be successful based at least in part on the at least one characteristic; and limiting uplink transmission responsive to determining that uplink transmission is unlikely to be successful based at least in part on the at least one characteristic, wherein limiting uplink transmission is based on at least one of the following: whether a number of radio link failure messages within a period of time exceeds a first threshold; or whether a rate of non-positive acknowledgements exceeds a second threshold; and permitting uplink transmission for user data if at least one of the following occurs: a successful radio link disconnect; the mobile device changes cells; user interaction is detected; or a rate of positive acknowledgements exceeds a third threshold.

10. The mobile device of claim 9, wherein the data service level uplink transmission controller is configured to:
determine if the mobile device is in any one of a low mobility environment or single cell coverage; and
limit uplink transmission based further at least in part on whether the mobile device is in any one of a low mobility environment or single cell coverage.

11. The mobile device of claim 9, wherein tracking acknowledgement results for past uplink transmissions comprises tracking acknowledgement results for:
uplink access attempts made by the mobile device on an uplink random access channel (RACH) in idle mode.

12. The mobile device of claim 9, wherein tracking acknowledgement results for past uplink transmissions comprises tracking acknowledgement results for uplink transmission of packet data units (PDUs) made by the mobile device in connected mode.

13. A non-transitory computer readable memory containing instructions which when executed by a processor cause a mobile device to perform:
monitoring by the mobile device at least one characteristic related to uplink transmission;
determining whether uplink transmission is unlikely to be successful based at least in part on the at least one characteristic;
transmitting user data on the uplink responsive to determining that the transmission of user data is likely to be successful based at least in part on the at least one characteristic; and
responsive to determining that uplink transmission is unlikely to be successful based at least in part on the at least one characteristic, inhibiting non-emergency uplink transmission for user data at the data service level while permitting at least one of the following: network-required uplink transmissions; or emergency uplink transmissions.

14. The non-transitory computer readable memory of claim 13, wherein limiting uplink transmission for user data at the data service level comprises:
permitting uplink transmission for user data responsive to detecting user interaction with the mobile device; and
inhibiting uplink transmission for user data in the absence of detecting user interaction with the mobile device.

15. A non-transitory computer readable memory containing instructions which when executed by a processor cause a mobile device to perform:
monitoring by the mobile device at least one characteristic related to uplink transmission, wherein monitoring at least one characteristic related to uplink transmission comprises at least one of the following: tracking radio link failure messages; or tracking acknowledgement results for past uplink transmissions;
determining whether uplink transmission is unlikely to be successful based at least in part on the at least one characteristic;
transmitting user data on the uplink transmission responsive to determining that the transmission of user data is likely to be successful based at least in part on the at least one characteristic; and
limiting uplink transmission responsive to determining that uplink transmission is unlikely to be successful based at least in part on the at least one characteristic, wherein limiting uplink transmission is based on at least one of the following: whether a number of radio link failure messages within a period of time exceeds a first threshold; or whether a rate of non-positive acknowledgements exceeds a second threshold; and
permitting uplink transmission for user data if at least one of the following occurs: a successful radio link disconnect; the mobile device changes cells; user interaction is detected; or a rate of positive acknowledgements exceeds a third threshold.

16. The non-transitory computer readable memory of claim 15, wherein tracking acknowledgement results for past uplink transmissions comprises tracking acknowledgement results for:
uplink access attempts made by the mobile device on an uplink random access channel (RACH) in idle mode.

17. The non-transitory computer readable memory of claim 15, wherein tracking acknowledgement results for past uplink transmissions comprises tracking acknowledgement results for: uplink transmission of packet data units (PDUs) made by the mobile device in connected mode.

18. The non-transitory computer readable memory of claim 15, wherein the instructions further comprise instructions which when executed by the processor cause the mobile device to perform:
determining if the mobile device is in any one of a low mobility environment or single cell coverage, wherein limiting uplink transmission is further based at least in part on whether the mobile device is in any one of a low mobility environment or single cell coverage.

* * * * *